United States Patent
Demirors et al.

(10) Patent No.: US 10,457,799 B2
(45) Date of Patent: Oct. 29, 2019

(54) ETHYLENE-BASED POLYMER COMPOSITIONS FOR IMPROVED EXTRUSION COATINGS

(71) Applicant: Dow Global Technologies LLC, Midland, MI (US)

(72) Inventors: Mehmet Demirors, Pearland, TX (US); Teresa P. Karjala, Lake Jackson, TX (US); Yijian Lin, Manvel, TX (US); James L. Cooper, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/574,261

(22) PCT Filed: Jun. 30, 2015

(86) PCT No.: PCT/US2015/038626
§ 371 (c)(1),
(2) Date: Nov. 15, 2017

(87) PCT Pub. No.: WO2017/003463
PCT Pub. Date: Jan. 5, 2017

(65) Prior Publication Data
US 2018/0134881 A1    May 17, 2018

(51) Int. Cl.
*C08L 23/06* (2006.01)
*C09D 123/06* (2006.01)

(52) U.S. Cl.
CPC .......... *C08L 23/06* (2013.01); *C09D 123/06* (2013.01); *C08L 2205/025* (2013.01); *C08L 2207/062* (2013.01); *C08L 2207/066* (2013.01)

(58) Field of Classification Search
CPC ... C09D 123/06; C08L 23/06; C08L 23/0815; C08L 2205/025; C08L 2207/062; C08L 2207/066
See application file for complete search history.

(56) References Cited

U.S. PATENT DOCUMENTS

| | | | |
|---|---|---|---|
| 6,291,590 B1 | 9/2001 | Sainio et al. | |
| 7,776,987 B2 | 8/2010 | Oswald et al. | |
| 7,812,094 B2 | 10/2010 | Kvamme et al. | |
| 7,956,129 B2 | 6/2011 | Chai | |
| 8,247,065 B2 | 8/2012 | Best et al. | |
| 9,228,036 B2 | 1/2016 | Berbee et al. | |
| 9,394,389 B2 * | 7/2016 | Berbee et al. | C08F 110/02 |
| 2015/0175827 A1 * | 6/2015 | Keshtkar et al. | B05D 1/265 427/358 |
| 2016/0304638 A1 | 10/2016 | Den Doelder et al. | |

FOREIGN PATENT DOCUMENTS

| | | |
|---|---|---|
| EP | 0792318 A1 | 9/1997 |
| EP | 1187876 B1 | 4/2003 |
| EP | 1777238 A1 | 4/2007 |
| EP | 2123707 B1 | 10/2010 |
| JP | H06322189 A | 11/1994 |
| JP | 2012251006 A | 12/2012 |
| JP | 2012255138 A | 12/2012 |
| WO | 83/00490 | 2/1983 |
| WO | 2005/068548 A1 | 7/2005 |
| WO | 2013/078224 A1 | 5/2013 |
| WO | 2013/178241 A1 | 12/2013 |
| WO | 2013/178242 A1 | 12/2013 |
| WO | 2014/081458 A1 | 5/2014 |
| WO | 2014/190036 A1 | 11/2014 |
| WO | 2014/190039 A1 | 11/2014 |
| WO | 2014/190041 A1 | 11/2014 |
| WO | 2015/092662 A1 | 6/2015 |

OTHER PUBLICATIONS

Communication pursuant to Article 94(3) EPC dated Oct. 29, 2018, pertaining to EPO Application No. 15744758.2.
Frey, 2009 Consumer Packaging Solutions for Barrier Performance course, TAPPI Place, 45 pages.
Ghijsels, Intern. Polymer Processing, 1992, vol. 7, p. 44-50.
Gregory, Extrusion Coating, A Process Manual, 2010, p. 141.
Ineos, Olefins and Polymers Europe, Your Partner in Extrusion Coating, Goods that Make Our Life Convenient, prior to May 2015, six pages.
Leroy, Plastics and Rubber Processing and Applications, 1987, vol. 8, p. 37-47.
Savargaonkar, Plastics Technology, 2014, p. 44-47 and 50.
Xanthos, Polymer Engineering and Science, 1997, vol. 37, No. 6, p. 1102-1112.
PCT/US2015/038626, International Search Report and Written Opinion dated Mar. 29, 2016.
PCT/US2015/038626, International Preliminary Report on Patentability dated Jan. 2, 2018.
Office Action pertaining to corresponding Japanese Patent Application No. 2017-566828, dated Jun. 11, 2019.

\* cited by examiner

*Primary Examiner* — Nathan M Nutter
(74) *Attorney, Agent, or Firm* — Dinsmore & Shohl LLP

(57) ABSTRACT

The invention provides a composition comprising at least the following: a) a first composition comprising at least one first ethylene-based polymer, formed by high pressure, free-radical polymerization, and wherein the first composition comprises the following properties: a melt index (I2) from 1.0 to 15.0 g/10 min, and density from 0.910 to 0.940 g/cc; b) a second composition comprising at least one second ethylene-based polymer, and wherein the second composition comprises the following properties; a melt index (I2) from 1.0 to 1000 g/10 min, a density greater than 0.940 g/cc; wherein the composition comprises the following properties: melt index (I2) from 2.0 to 20.0 g/10 min, and a density from 0.915 to 0.940 g/cc; and wherein the first composition is present in an amount from 65 to 95 wt %, based on the weight of the composition.

18 Claims, 3 Drawing Sheets

ETHYLENE-BASED POLYMER COMPOSITIONS FOR IMPROVED EXTRUSION COATINGS

BACKGROUND

The invention is directed to ethylene-based polymer compositions that have improved extrusion coating, adhesion, and barrier properties. Polymer compositions based on LDPE are often used in extrusion coating applications. LDPE prepared using tubular technology ("tubular LDPE") is more economical than LDPE prepared using autoclave technology ("autoclave LDPE"). However, "tubular LDPE" has lower melt strength, which often can lead to poorer extrusion coating properties. Thus, there is a need for new polymer compositions based on more economical "tubular LDPE," and which have improved extrusion coating properties. There is a further need for such compositions that have improved adhesion and barrier properties.

International Publication WO 2014/081458 discloses compositions comprising a first ethylene-based polymer, formed by a high pressure, free-radical polymerization process, and comprising the following properties: a) a Mw(abs) versus melt index I2 relationship: $Mw(abs) < A \times [(I2)B]$, where $A = 5.00 \times 10^2$ (kg/mole)/(dg/min)B, and $B = -0.40$; and b) a MS versus I2 relationship: $MS \geq C \times [(I2)D]$, where $C = 13.5$ cN/(dg/min)D, and $D = -0.55$. These compositions can be used to form coatings, film, foam, laminate, fibers, tapes, wire and cable, and woven or non-woven fabrics.

B. H. Gregory, Extrusion Coating, A Process Manual, 2010, page 141, discloses HDPE/LDPE blends for extrusion coating. International Publication WO 2005/068548 discloses a polymer composition for extrusion coating with good process properties comprising a multimodal high density polyethylene and a low density polyethylene.

International Publication WO 2013/078018 discloses compositions comprising an ethylene-based polymer comprising the following properties: a) a melt index (I2)>2.0 dg/min; b) a Mw(abs) versus I2 relationship: $Mw(abs) < A + B(I2)$, where $A = 2.40 \times 10^5$ kg/mole, and $B = -8.00 \times 10^3$ (g/mole)/(dg/min); and c) a G' versus I2 relationship: $G' > C + D(I2)$, where $C = 127.5$ Pa, and $D = -1.25$ Pa/(dg/min). The invention also provides an ethylene-based polymer comprising the following properties: a) a melt index (I2)>2.0 dg/min; b) a G' versus I2 relationship: $G' > C + D(I2)$, where $C = 127.5$ Pa, and $D = -1.25$ Pa/(dg/min) c) a chloroform extractable (Clext) versus G' relationship: $Clext. < E + FG'$, where $E = 0.20$ wt %, and $F = 0.060$ wt %/Pa; and d) a "weight fraction (w) of molecular weight greater than $10^6$ g/mole, based on the total weight of polymer, and as determined by GPC(abs), "that meets the following relationship: $w < I + J(I2)$, where $I = 0.080$, and $J = -4.00 \times 10^{-3}$ min/dg. The compositions can be used for extrusion coating applications.

U.S. Pat. No. 7,956,129 discloses polymer blends comprising (a) 1-99% by weight of a copolymer of ethylene and an alpha olefin having from 3 to 10 carbon atoms, said copolymer having (iv) a density in the range 0.905 to 0.940 g·cm$^{-3}$, (v) a melt elastic modulus G' (G"=500 Pa) in the range 10 to 150 Pa, and (vi) a melt index in the range 5 to 50, and (b) from 1-99% by weight of a low density polyethylene (LDPE) polymer having a density from 0.914 to 0.928 g·cm$^{-3}$, wherein the sum of (a) and (b) is 100%. The copolymers of component (a) are typically prepared by use of metallocene catalysts. The blends exhibit advantageous melt elastic modulus in the range 30 to 200 Pa. The blends are disclosed as suitable for extrusion coating applications.

International Publication WO 2014/081458 discloses an extrusion coating process of a polyethylene resin on a substrate, and where the polyethylene resin has a density from 0.940 g/cm$^3$ to 0.960 g/cm$^3$, and is prepared in the presence of an activated bridged bis-(tetrahydro-indenyl) metallocene catalyst. The resin may be used alone or in combination with LDPE.

U.S. Pat. No. 7,812,094 discloses a polymer blend suitable for the production of film, said polymer blend comprising at least (1) a multimodal high density polyethylene (HDPE) composition, and (2) a low density polyethylene (LDPE) polymer, a linear low density polyethylene (LLDPE) polymer or a mixture of LDPE and LLDPE polymers. The HDPE composition comprising a multimodal HDPE polymer, which contains at least a lower molecular weight (LMW) polyethylene component and a higher molecular weight (HMW) polyethylene component.

Other ethylene-based polymer compositions for coatings and/or other applications are disclosed in the following references: U.S. Pat. Nos. 8,247,065, 6,291,590, 7,776,987; International Publications Nos. WO83/00490, WO2015/092662, WO 2014/190041, WO 2014/190036, WO 2014/190039, WO2013178242A1, WO2013178241A1, WO 2013/078224; European Patent Application Nos. 1187876A1, EP0792318A1, EP1777238A1, EP2123707A1, and EP2123707A1. See also, A. Ghijsels et al., *Melt Strength Behavior of Polyethylene Blends*, Intern. Polymer Processing, VII, 1992, pp. 44-50; M. Xanthos et al., *Measurement of Melt Viscoelastic Properties of Polyethylenes and Their Blends—A Comparison of Experimental Techniques*, Polymer Engineering and Science, Vol. 37, No. 6, 1997, pp. 1102-1112; INEOS, Olefins and Polymers Europe, Your Partner in Extrusion Coating, Goods that Make Our Life Convenient, prior to May 2015, six pages; K. R. Frey, *Polyethylene and Polypropylene in Flexible Barrier Packaging*, 2009 Consumer Packaging Solutions for Barrier Performance course, TAPPI Place, 45 pages; N. Savargaonkar et al., *Formulating LLDPE/LDPE Blends for Abuse—Resistant Blown Film,* Plastics Technology, 2014, pp. 44-47 and 50.

However, as discussed above, there is a need for new polymer compositions, based on more economical "tubular LDPE," and which have improved extrusion coating properties. There is a further need for such compositions that have improved adhesion (for example, Heat Seal Strength) and barrier (for example, Water Vapor Transmission Rate) properties. These needs have been met by the following invention.

SUMMARY OF INVENTION

The invention provides a composition comprising at least the following:

a) a first composition comprising at least one first ethylene-based polymer, formed by high pressure, free-radical polymerization, and wherein the first composition comprises the following properties: a melt index (I2) from 1.0 to 15.0 g/10 min, and density from 0.910 to 0.940 g/cc;

b) a second composition comprising at least one second ethylene-based polymer, and wherein the second composition comprises the following properties; a melt index (I2) from 1.0 to 1000 g/10 min, a density greater than 0.940 g/cc;

wherein the composition comprises the following properties: melt index (I2) from 2.0 to 20.0 g/10 min, and a density from 0.915 to 0.940 g/cc; and wherein the first composition is present in an amount from 65 to 95 wt %, based on the weight of composition.

BRIEF DESCRIPTION OF THE DRAWINGS

As seen in FIG. 1, the notations are as follows: fresh ethylene is fed through line 1; discharge of Primary A is sent through line 2; discharge of Primary B is sent through line 3; 4 and 5 are each a line feed to the Hyper compressor; fresh CTA is fed through each of lines 6 and 7; 8 is a line feed to feed lines 20 and 21, each to the side of the reactor; 9 is a line feed from the Hyper compressor to the front of the reactor; 10 is a line feed from the reactor to the HPS (High Pressure Separator); 11 is a line feed from the HPS to the LPS (Low Pressure Separator); 12 is a discharge line from the LPS; 13 is a line feed from the LPS to the Booster; 14 is a discharge feed from the Booster; 15 is a recycle feed line from the HPS to lines 16 and 17; 16 is a purge line; 17 is a recycle line; 18 and 19 are recycle lines to the Hyper compressor.

DETAILED DESCRIPTION

Figure 1:
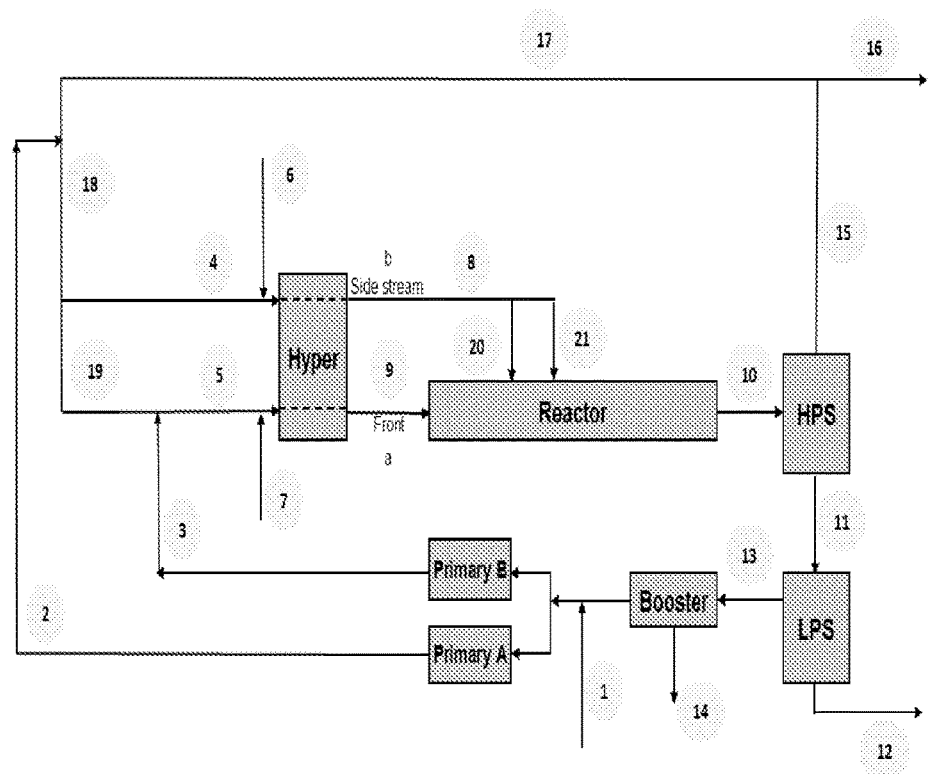
FIG. 1 depicts a polymerization configuration.
Figure 2:
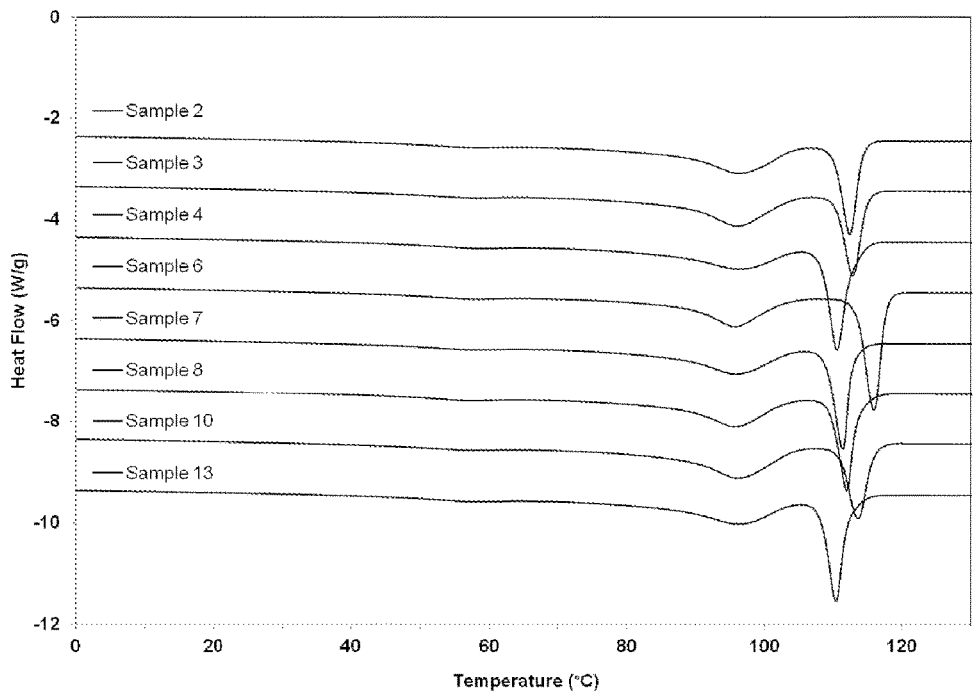
FIG. 2 depicts DSC thermograms of several LDPE/HDPE compositions (first cooling).
Figure 3:
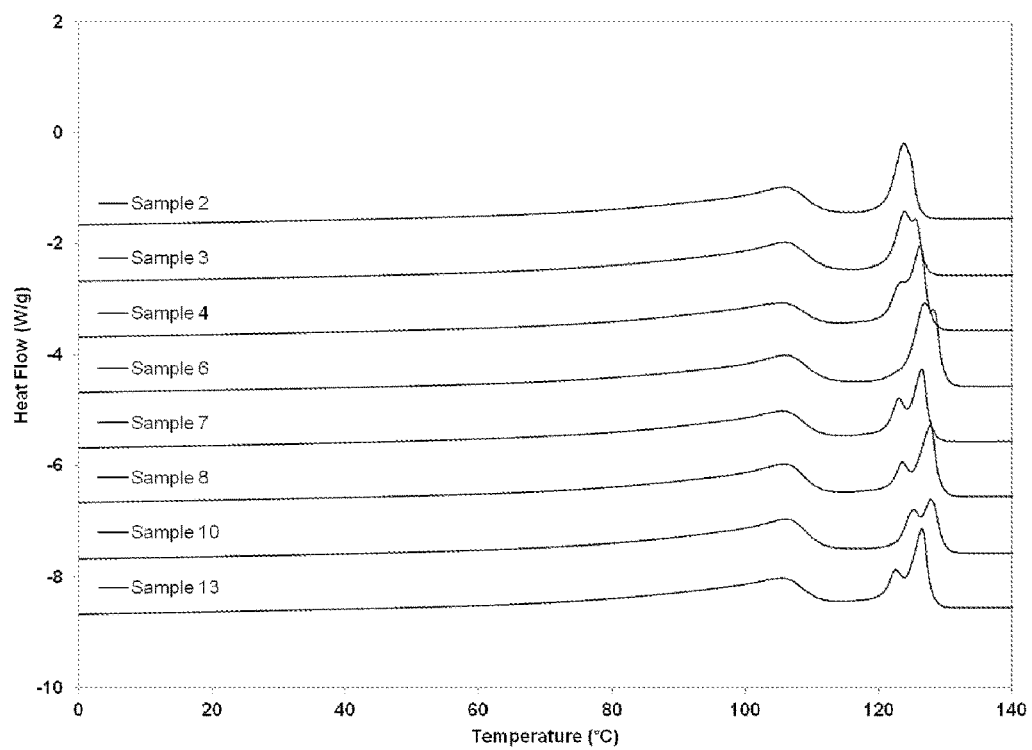
FIG. 3 depicts DSC thermograms of several LDPE/HDPE compositions (second heating).
Figure 4:
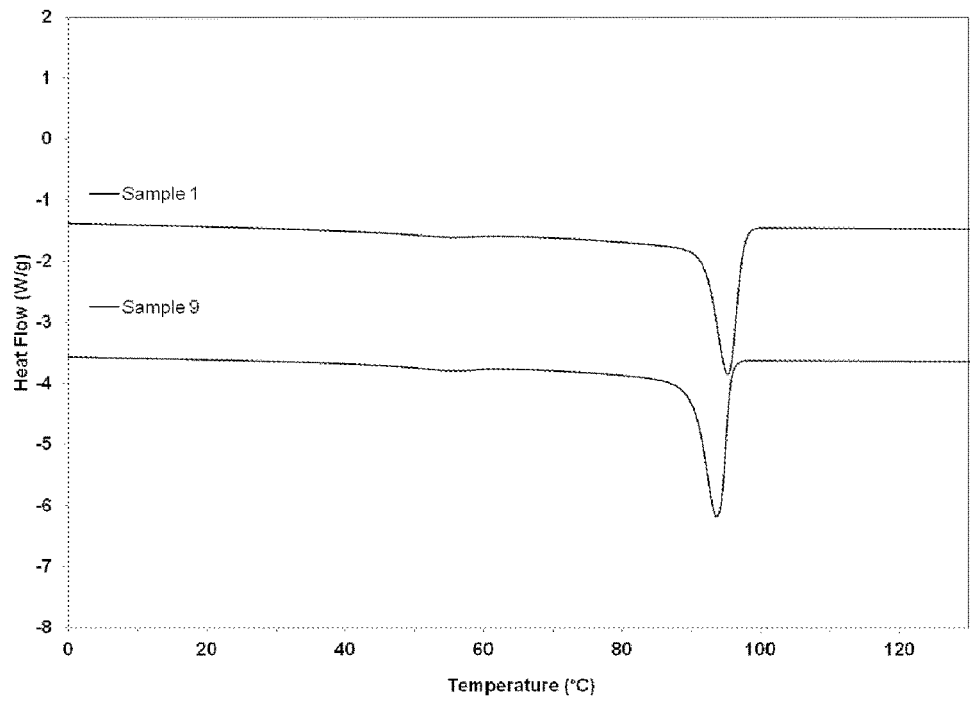
FIG. 4 depicts DSC thermograms of some LDPE polymers (first cooling).
Figure 5:
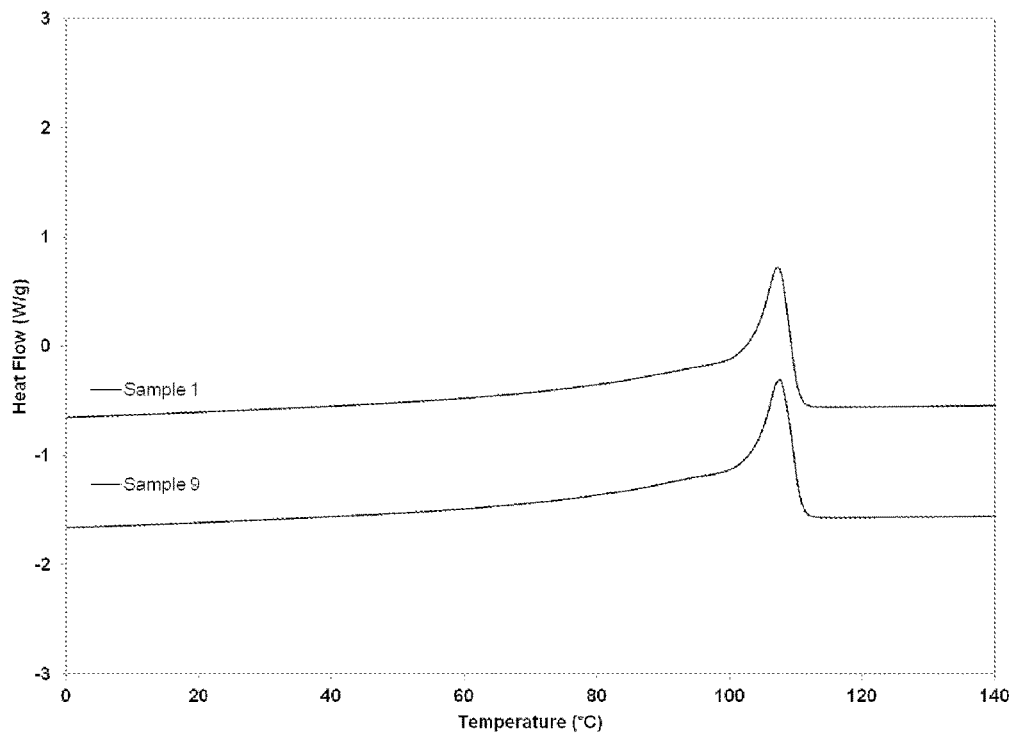
FIG. 5 depicts DSC thermograms of some LDPE polymers (second heating).

As discussed above, the invention provides a composition comprising the following:

a) a first composition comprising at least one first ethylene-based polymer, formed by high pressure, free-radical polymerization, and wherein the first composition comprises the following properties: a melt index (I2) from 1.0 to 15.0 g/10 min, and density from 0.910 to 0.940 g/cc;

b) a second composition comprising at least one second ethylene-based polymer, and wherein the second composition comprises the following properties; a melt index (I2) from 1.0 to 1000 g/10 min, a density greater than 0.940 g/cc;

wherein the composition comprises the following properties: melt index (I2) from 2.0 to 20.0 g/10 min, and a density from 0.915 to 0.940 g/cc; and wherein the first composition is present in an amount from 65 to 95 wt %, based on the weight of composition.

The inventive composition may comprise a combination of two or more embodiments described herein.

The first composition may comprise a combination of two or more embodiments described herein.

The first ethylene-based polymer may comprise a combination of two or more embodiments as described herein.

The second composition may comprise a combination of two or more embodiments described herein.

The second ethylene-based polymer may comprise a combination of two or more embodiments as described herein.

In one embodiment, the melt index (I2) ratio of "the second composition" to "the first composition" is from 0.50 to 2.70, or from 0.5 to 2.65, or from 0.5 to 2.60, or from 0.5 to 2.50.

In one embodiment, the melt index (I2) ratio of "the composition" to "the second composition" is from 0.30 to 2.00, or from 0.40 to 2.00, or from 0.50 to 2.00.

In one embodiment, the first composition has a melt index (I2) from 1.0 g/10 min to 10.0 g/10 min, further from 2.0 g/10 min to 10.0 g/10 min, further from 3.0 to 10.0 g/10 min, further from 3.0 g/10 min to 6.0 g/10 min (ASTM 2.16 kg/190° C.).

In one embodiment, the first composition has a density greater than, or equal to, 0.915 g/cc, or greater than, or equal to, 0.918 g/cc.

In one embodiment, the first composition has a density greater than, or equal to, 0.920 g/cc, or greater than, or equal to, 0.922 g.

In one embodiment, the first composition has a density less than, or equal to, 0.940 g/cc, further less than, or equal to, 0.935 g/cc, further less than, or equal to, 0.935 g/cc.

In one embodiment, the first composition has a density from 0.910 to 0.940 g/cc, further from 0.915 g/cc to 0.930 g/cc (1 cc=1 cm$^3$).

In one embodiment, the first composition is polymerized in a tubular reactor.

In one embodiment, the first composition polymer is polymerized in at least one tubular reactor. In a further embodiment, the first composition is polymerized in a tubular reactor system that does not comprise an autoclave reactor.

In one embodiment, the first composition is prepared in a reactor configuration comprising at least one tubular reactor.

The first composition may comprise a combination of two or more embodiments as described herein.

In one embodiment, the first composition is present in an amount from 70 to 95 wt %, further from 75 to 95 wt %, further from 80 to 95 wt %, further from 80 to 90 wt %, based on the weight of the composition.

In one embodiment, the first composition comprises ≥95 wt %, further ≥98 wt %, further ≥99 wt % of the first ethylene-based polymer, based on the weight of the first composition. In a further embodiment, the first ethylene-based polymer is a LDPE.

In one embodiment, the first ethylene-based polymer has a melt index (I2) from 1.0 g/10 min to 10.0 g/10 min, further from 2.0 g/10 min to 10.0 g/10 min, further from 2.5 g/10 min to 6.0 g/10 min (ASTM 2.16 kg/190° C.).

In one embodiment, the first ethylene-based polymer has a density greater than, or equal to, 0.915 g/cc, or greater than, or equal to, 0.918 g/cc.

In one embodiment, the first ethylene-based polymer has a density greater than, or equal to, 0.920 g/cc, or greater than, or equal to, 0.922 g.

In one embodiment, the first ethylene-based polymer has a density less than, or equal to, 0.940 g/cc, further less than, or equal to, 0.935 g/cc, further less than, or equal to, 0.930 g/cc.

In one embodiment, the first ethylene-based polymer has a density from 0.910 to 0.940 g/cc, further from 0.915 g/cc to 0.930 g/cc (1 cc=1 cm$^3$).

In one embodiment, the first composition is prepared in a tubular reactor, and has a melt index (I2) from 3.0 to 10.0 g/10 min, and a G' value (at G"=500 Pa, 170° C.)≥127.5 Pa-1.25 Pa/(g/10 min)×I2.

In one embodiment, the first composition is prepared in a tubular reactor, and has a melt index (I2) from 3.0 to 10.0 g/10 min, a density from 0.916 to 0.928 g/cc, further 0.916 to 0.925 g/cc, further from 0.916 to 0.920 g/cc; the second composition has a melt index (I2) from 4.0 to 20.0 g/10 min, a density from 0.955 to 0.970 g/cc; and wherein the composition has a melt index (I2) from 3.0 to 10.0 g/10 min, and a G' (at G"=500 Pa, 170° C.) from 100 to 200 Pa; and wherein the second composition is present in an amount from 10 to 20 wt %, based on the weight of the composition.

In one embodiment, the first ethylene-based polymer is selected from a polyethylene homopolymer or an ethylene-based interpolymer.

In one embodiment, the first ethylene-based polymer is a LDPE.

In one embodiment, the first ethylene-based polymer is polymerized in at least one tubular reactor. In a further embodiment, the first ethylene-based polymer is polymerized in a tubular reactor system that does not comprise an autoclave reactor.

In one embodiment, the first ethylene-based polymer is prepared in a tubular reactor.

In one embodiment, the first ethylene-based polymer is prepared in a reactor configuration comprising at least one tubular reactor.

The first ethylene-based polymer may comprise a combination of two or more embodiments as described herein.

In one embodiment, the first ethylene-based polymer is present in an amount from 70 to 95 wt %, further from 75 to 95 wt %, further from 80 to 95 wt %, further from 80 to 90 wt %, based on the weight of the composition.

In one embodiment, the composition has a melt index (I2) from 2.0 to 15.0 g/10 min, further from 2.5 to 10.0 g/10 min, and further from 3.0 to 5.0 g/10 min, and further from 3.0 to 4.0 g/10 min.

In one embodiment, the composition has a density from 0.910 to 0.935 g/cc, further from 0.910 to 0.930 g/cc.

In one embodiment, the melt index (I2) ratio of the composition to the first ethylene-based polymer is from 0.50 to 3.00, or from 0.55 to 2.95, or from 0.60 to 2.90, or from 0.65 to 2.85.

In one embodiment, the composition has a G' value at a G"=500 Pa greater than, or equal to, 80 Pa, at 170° C., further greater than, or equal to, 90 Pa, at 170° C., further greater than, or equal to, 100 Pa, at 170° C.

In one embodiment, the composition has a G' value at G"=500 Pa, greater than, or equal to, 120 Pa, at 170° C., further greater than, or equal to, 130 Pa, at 170° C., further greater than, or equal to, 140 Pa, at 170° C.

In one embodiment, the composition has a Water Vapor Transmission Rate value as follows: WVTR (38° C. 100% RH according to ASTM 1249-06, at 1 mil thickness coating) ≤1.8 (g/100 in$^2$/day), further ≤1.7 (g/100 in$^2$/day), further ≤1.6 (g/100 in$^2$/day).

In one embodiment, the composition of any one of the previous claims, wherein the first composition is prepared in a tubular reactor, and has a melt index (I2) from 3.0 to 10.0 g/10 min, further from 3.0 to 5.0 g/10 min, a density from 0.916 to 0.928 g/cc; the second composition has a melt index (I2) from 4.0 to 20.0 g/10 min, a density from 0.955 to 0.970 g/cc; and wherein the composition has a melt index (I2) from 3.0 to 10.0 g/10 min, and a G' (at G"=500 Pa, 170° C.) from 100 to 200 Pa; and wherein the second composition is present in an amount from 10 to 20 wt %, based on the weight of the composition.

In one embodiment, the composition has a melt strength greater than, or equal to, 9.0 cN, at 190° C., further greater than, or equal to, 12.0 cN, at 190° C., further greater than, or equal to, 15.0 cN, at 190° C.

In one embodiment, the composition has a melt strength value greater than, or equal to, 8.0 cN, at 190° C., further greater than, or equal to, 9.0 cN, at 190° C., further greater than, or equal to, 10.0 cN, at 190° C.

In one embodiment, the composition has a "neck-in" value≤3 inch, at a set polymer melt temperature=600° F., a coating thickness=1 mil, an open die width=24 inches, a die gap=25 mils, an air gap=6 inches, a throughput rate=250 pounds/hour and a line speed=440 feet/min.

In one embodiment, the composition has a "draw-down" value≥800 feet/min, at a set polymer melt temperature=600° F., a coating thickness=1 mil, an open die width=24 inches, a die gap=25 mils, an air gap=6 inches, and a throughput rate=250 pounds/hour. Draw down is defined as the maximum line speed attainable before web breakage or web defects/edge inconsistencies occur, when accelerating the line speed at a constant polymer output. The constant polymer coating output level is set by a throughput rate of 250 pounds/hour. Neck-in is the difference between the final width of the web and the die width at fixed line speed.

In one embodiment, the composition comprises ≥95 wt %, further ≥98 wt %, further ≥99 wt % the sum of components a and b, based on the weight of the composition.

In one embodiment, the composition has at least one melting temperature (Tm)≥110° C., or ≥115° C., or ≥120° C.

In one embodiment, the composition has at least one melting temperature (Tm) from 95° C. to 115° C., or from 97° C. to 112° C., or from 100° C. to 110° C.

In one embodiment, the composition has a tan delta (0.1 rad/s, 190° C.)≥3.00, or ≥3.50, or ≥4.00.

In one embodiment, the composition has a tan delta (0.1 rad/s, 190° C.) from 3.00 to 10.00, or from 3.50 to 9.00, or from 4.00 to 8.00.

In one embodiment, the composition has a V0.1/V100 (each at 190° C.)≥6.0, or ≥7.0, or ≥8.0.

In one embodiment, the composition has a V0.1/V100 (each at 190° C.) from 6.0 to 14.0, or from 7.0 to 12.0, or from 8.0 to 10.0.

In one embodiment, the composition has a V0.1 (0.1 rad/s, 190° C.)≥1900 Pa·s, or ≥2000 Pa·s, or ≥2500 Pa·s.

In one embodiment, the composition has a V0.1 (0.1 rad/s, 190° C.) from 1900 to 5000 Pa·s, or from 2000 to 5000 Pa·s, or from 2500 to 5000 Pa·s, or from 3000 to 5000 Pa·s.

In one embodiment, the composition has a $M_{w,cc}$≥350,000 g/mole, or ≥400,000 g/mole, or ≥450,000 g/mole.

In one embodiment, the composition has $M_{w,cc}$ from 350,000 to 900,000 g/mole, or from 400,000 g/mole to 850,000 g/mole, or from 450,000 to 800,000 g/mole.

In one embodiment, the composition has a $M_{w,cc}/M_{n,cc}$≥7.00, or ≥7.50, or ≥8.00.

In one embodiment, the composition has a $M_{w,cc}/M_{n,cc}$ from 7.00 to 12.00, or from 7.00 to 11.00, or from 7.00 to 10.00.

In one embodiment, the composition has a $M_{w,abs}/M_{n,cc}$≥16.0, or ≥17.0, or ≥18.0.

In one embodiment, the composition has an $M_{w,abs}/M_{n,cc}$ from 16.0 to 26.0, or from 17.0 to 25.0, or from 18.0 to 24.0.

In one embodiment, the composition is prepared by a melt compounding process, or by a dry blending process.

An inventive composition may comprise a combination of two or more embodiments as described herein.

In one embodiment, the second composition has a density >0.945, or ≥0.950, or ≥0.955, or ≥0.960 g/cc.

In one embodiment, the second composition has a melt index (I2) from 4.0 to 40.0 g/10 min, further from 4.0 to 30.0 g/10 min, further from 4.0 to 20.0 g/10 min.

In one embodiment, the second ethylene-based polymer is a polyethylene homopolymer. In a further embodiment, the polyethylene homopolymer has a density from 0.940 to 0.985 g/cc, further from 0.945 to 0.980 g/cc, further from 0.950 to 0.975 g/cc.

In one embodiment, the second ethylene-based polymer has a melt index from 2.0 to 500 g/10 min, further from 3.0 to 200 g/10 min, further from 4.0 to 100 g/10 min.

In one embodiment, the second ethylene-based polymer has a melt index from 2.0 to 50.0 g/10 min, further from 3.0 to 20.0 g/10 min, further from 4.0 to 15.0 g/10 min, further from 5.0 to 10.0 g/10 min.

In one embodiment, the second composition comprises at least one HDPE.

In one embodiment, the second composition comprises only one HDPE and does not comprise a multimodal HDPE blend of two or more HDPE polymers.

As used herein the term "multimodal HDPE blend" refers to a polymer blend containing at least two HDPE polymers. Such blends can be in-situ reactor blends formed using two or more catalyst systems and/or two or more sets of polymerization conditions; or can be post-reactor blends of two or more different HDPE polymers (for example, two or more HDPE polymers that differ in one or more of the following properties: density, melt index, Mw, Mn, MWD, or other properties).

In a further embodiment, the second composition comprises only one second ethylene-based polymer. In a further embodiment, the second ethylene-based polymer is a HDPE.

In one embodiment, the second composition comprises ≥95 wt %, further ≥98 wt %, further ≥99 wt % of the second ethylene-based polymer, based on the weight of the second composition. In a further embodiment, the second ethylene-based polymer is a HDPE.

In one embodiment, the second composition comprises ≥95 wt %, further ≥98 wt %, further ≥99 wt % of one HDPE, based on the weight of the second composition.

In one embodiment, the second composition has a density from 0.940 to 0.966 g/cc. In a further embodiment, the second ethylene-based polymer is a HDPE.

In one embodiment, the second composition has a $M_{w,cc}/M_{n,cc}$ from 1.5 to 5.0, or from 1.5 to 4.0, or from 1.5 to 3.5, or from 1.5 to 3.0, or from 1.5 to 2.5.

In one embodiment, the second composition has a $M_{w,cc}/M_{n,cc}$ from 1.8 to 4.0, or from 1.9 to 3.8, or from 2.0 to 3.6, or from 2.1 to 3.4.

In one embodiment, the second ethylene-based polymer has a $M_{w,cc}/M_{n,cc}$ from 1.5 to 5.0, or from 1.5 to 4.0, or from 1.5 to 3.5, or from 1.5 to 3.0, or from 1.5 to 2.5.

In one embodiment, the second ethylene-based polymer has a $M_{w,cc}/M_{n,cc}$ from 1.8 to 4.0, or from 1.9 to 3.8, or from 2.0 to 3.6, or from 2.1 to 3.4.

The second composition may comprise a combination of two or more embodiments as described herein.

The invention also provides an article comprising at least one component formed from an inventive composition.

In one embodiment, the article is selected from a coating, a film, a foam, a laminate, a fiber, or a tape.

In one embodiment, the article is an extrusion coating. In another embodiment, the article is a film.

An inventive article may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400, more typically from 120 to 360, and even more typically from 150 to 320 MPa.

The polymerization temperature in each tubular reactor zone of the process is typically from 100 to 400° C., more typically from 130 to 360° C., and even more typically from 140 to 330° C.

The polymerization temperature in each autoclave reactor zone of the process is typically from 150 to 300° C., more typically from 165 to 290° C., and even more typically from 180 to 280° C. One skilled in the art understands that the temperatures in the autoclave are considerably lower and less differentiated than those of the tubular reactor, and thus, more favorable extractable levels are typically observed in polymers produced in an autoclave-based reactor system.

The high pressure process of the present invention to produce polyethylene homo or interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied, should allow high temperature operation in the range from 300° C. to 350° C. Free radical initiators that are generally used include organic peroxides, such as peresters, perketals, peroxy ketones, percarbonates and cyclic multifunctional peroxides. These organic peroxy initiators are used in conventional amounts, typically from 0.005 to 0.2 wt % based on the weight of polymerizable monomers.

Other suitable initiators include azodicarboxylic esters, azodicarboxylic dinitriles and 1,1,2,2-tetramethylethane derivatives, and other components capable of forming free radicals in the desired operating temperature range.

Peroxides are typically injected as diluted solutions in a suitable solvent, for example, in a hydrocarbon solvent.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the molecular weight, for example, the number average molecular weight, Mn. The melt flow index (MFI or $I_2$) of a polymer, which is related to Mn, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol. The chain transfer agent may also be a monomeric chain transfer agent. For example, see WO 2012/057975, U.S. 61/579,067 (see International Application No. PCT/US12/068727 filed Dec. 10, 2012) and U.S. 61/664,956 (filed Jun. 27, 2012).

A further way to influence the melt index includes the build up and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Monomer and Comonomers

The term ethylene interpolymer as used in the present description and the claims refer to polymers of ethylene and one or more comonomers. Suitable comonomers to be used in the ethylene polymers of the present invention include, but are not limited to, ethylenically unsaturated monomers, and especially $C_{3-20}$ alpha-olefins, In one embodiment, the ethylene-based polymer does not contain comonomers capable of crosslinking polymer chains, for instance comonomers containing multiple unsaturations or containing an acetylenic functionality.

Additives

One or more additives may be added to a composition comprising an inventive polymer. Suitable additives include stabilizers; fillers, such as organic or inorganic particles, including clays, talc, titanium dioxide, and silicon dioxide.

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

Definitions

Unless stated to the contrary, implicit from the context, or customary in the art, all parts and percents are based on weight and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within a polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "ethylene-based copolymer" or "ethylene copolymer" refers to a copolymer that comprises a majority amount of polymerized ethylene based on the weight of the copolymer, and only one comonomer (thus, only two monomer types).

The phrase "high pressure, free-radical polymerization process," as used herein, refers to a free radical initiated polymerization carried out at an elevated pressure of at least 1000 bar (100 MPa).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Index (I2 and I10)

Melt flow indices were measured according to ASTM Method D1238 (Procedure B). The I2 and I10 were measured at 190° C./2.16 kg and 190° C./10.0 kg, respectively.

Density

Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Triple Detector Gel Permeation Chromatography (TDGPC)—Conventional GPC and Light Scattering GPC For the GPC techniques used herein (Conventional GPC, Light Scattering GPC, and gpcBR), a Triple Detector Gel Permeation Chromatography (3D-GPC or TDGPC) system was used. This system consisted of a PolymerChar (Valencia, Spain) GPC-IR High Temperature Chromatograph, equipped with a Precision Detectors (Now Agilent Technologies) 2-angle laser light scattering (LS) detector Model 2040, an IR5 infra-red detector and 4-capillary viscometer detector from PolymerChar. Data collection was performed using PolymerChar "Instrument Control" software. The system was also equipped with an on-line solvent degassing device from Agilent Technologies (CA, USA).

The eluent from the GPC column set flowed through each detector arranged in series, in the following order: IR5 detector, LS detector, then the Viscometer detector. The systematic approach for the determination of multi-detector offsets was performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Four 20-micron mixed-pore-size packing ("Mixed A", Agilent Technologies) are used for the separation. The PolymerChar Autosampler oven compartment was operated at 160° C. with low speed shaking for 3 hours, and the column compartment was operated at 150° C. The samples were prepared at a concentration of "2 milligrams per milliliter." The chromatographic solvent and the sample preparation solvent was 1,2,4-trichlorobenzene (TCB) containing "200 ppm of 2,6-di-tert-butyl-4methylphenol (BHT)." The solvent was sparged with nitrogen. The injection volume was 200 microliters. The flow rate through the GPC was set at 1 ml/minute. For this study, conventional GPC data and light scattering GPC data were recorded.

Conventional GPC

For Conventional GPC, the IR5 detector ("measurement sensor") was used, and the GPC column set was calibrated by running 21 narrow molecular weight distribution polystyrene standards. The molecular weight (MW) of the standards ranged from 580 g/mol to 8,400,000 g/mol, and the standards were contained in 6 "cocktail" mixtures. Each standard mixture had at least a decade of separation between individual molecular weights. The standard mixtures were purchased from Polymer Laboratories (now Agilent Technologies). The polystyrene standards were prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards were dissolved at 80° C., with gentle agitation, for 30 minutes. The narrow standards mixtures were run first, and in order of decreasing highest molecular weight component, to minimize degradation. The polystyrene standard peak molecular weights were converted to polyethylene molecular weight using Equation (1) (as described in Williams and Ward, J. Polym. Sci., Polym. Letters, 6, 621 (1968)):

$$MW_{PE}=A\times(MW_{PS})^B \quad \text{(Eq. 1)}$$

where MW is the molecular weight of polyethylene (PE) or polystyrene (PS) as marked, and B is equal to 1.0. It is known to those of ordinary skill in the art that A may be in a range of about 0.38 to about 0.44 such that the A value yields 52,000 $MW_{PE}$ for Standard Reference Materials (SRM) 1475a. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$M_{n,cc}=\Sigma w_i/\Sigma(w_i/M_{cc,i}) \quad \text{(Eq. 2)}$$

$$M_{w,cc}=\Sigma w_i M_{cc,i} \quad \text{(Eq. 3)}$$

$$M_{z,cc}=\Sigma(w_i M_{cc,i}^2)/\Sigma(w_i M_{cc,i}) \quad \text{(Eq. 4)}$$

where $M_{n,cc}$, $M_{w,cc}$, and $M_{z,cc}$ are the number-, weight-, and z-average molecular weight obtained from the conventional calibration, respectively. $w_i$ is the weight fraction of the polyethylene molecules eluted at retention volume $V_i$. $M_{cc,i}$ is the molecular weight of the polyethylene molecules eluted at retention volume $V_i$ obtained using the conventional calibration (see Equation (1)).

Light Scattering (LS) GPC

For the LS GPC, the Precision Detector PDI2040 detector Model 2040 15° angle was used. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, was obtained from the mass detector (IR5) area, and the mass detector constant, derived from a suitable linear polyethylene homopolymer, or one of the polyethylene standards of known weight-average molecular weight. The calculated molecular weights were obtained using a light scattering constant, derived from one or more of the polyethylene standards mentioned below, and a refractive index concentration coefficient, do/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight-average molecular weight ("$M_{w,abs}$") and absolute z-average molecular weight ("$M_{z,abs}$") is determined using Equations (5) and (6) below, using the "peak area" method (after detector calibration relating areas to mass and mass–molecular weight product) for higher accuracy and precision. The "LS.Area" and the "Concentration.Area" are generated by the chromatograph/detectors combination.

$$M_{w,abs} = \frac{\sum C_i M_{abs,i}}{\sum C_i} = \frac{\sum LS_i}{\sum C_i} = \frac{LS.\text{Area}}{\text{Concentration.Area}} \quad \text{(Eq. 5)}$$

$$M_{z,abs} = \sum (w_i M_{abs,i}^2) / \sum (w_i M_{abs,i}) \quad \text{(Eq. 6)}$$

where $C_i$ is the concentration of the polyethylene molecules in the eluant at the retention volume $V_i$, $M_{abs,i}$ is the absolute molecular weight of the polyethylene molecules at the retention volume $V_i$, $\Sigma LS_i$ (LS.Area) is the total response of the light scattering, and the $\Sigma C_i$ (Concentration.Area) is the total concentration.

For each LS profile, the x-axis (log $MW_{cc\text{-}GPC}$), where cc refers to the conventional calibration curve, is determined as follows. First, the polystyrene standards (see above) are used to calibrate the retention volume into "log $MW_{PS}$." Then, Equation (1) ($MW_{PE}$=A×($MW_{PS}$)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-GPC)). The y-axis for each LS profile is the LS detector response normalized by the injected sample mass. Initially, the molecular weight and intrinsic viscosity for a linear homopolymer polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

gpcBR Branching Index by Triple Detector GPC (3D-GPC)

The gpcBR branching index is determined by first calibrating the light scattering, viscosity, and concentration detector (IR5) as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight ($M_{PE}$) and polyethylene intrinsic viscosity ($[\eta]_{PE}$) as a function of elution volume, as shown in Equations (7) and (8):

$$M_{PE} = (K_{PS}/K_{PE})^{1/(\alpha_{PE}+1)} \cdot M_{PS}^{(\alpha_{PS}+1)/(\alpha_{PE}+1)} \quad \text{(Eq. 7)}$$

$$[\eta]_{PE} = K_{PS} \cdot M_{PS}^{\alpha_{PS}+1}/M_{PE} \quad \text{(Eq. 8)}$$

where $M_{PS}$ is the molecular weight of polystyrene.

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight ($M_{w, abs}$) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (9). The area calculation in Equations (5) and (9) offers more precision, because, as an overall sample area, it is much less sensitive to variation caused by detector noise and 3D-GPC settings on baseline and integration limits More importantly, the peak area calculation is not affected by the detector volume offsets. Similarly, the high-precision sample intrinsic viscosity (IV) is obtained by the area method shown in Equation (9):

$$IV_w = \frac{\sum C_i IV_i}{\sum C_i} = \frac{\sum \eta_{sp,i}}{\sum C_i} = \frac{\text{Viscometer.Area}}{\text{ConcentrationArea}} \quad \text{(Eq. 9)}$$

where $\eta_{sp,i}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (10):

$$IV_{cc} = \frac{\sum C_i IV_{i,cc}}{\sum C_i} = \frac{\sum C_i K(M_{i,cc})^{\alpha_{PE}}}{\sum C_i} \quad \text{(Eq. 10)}$$

Equation (11) is used to determine the gpcBR branching index:

$$gpcBR = \left(\frac{IV_{cc}}{IV_w}\right)\left(\frac{M_{w,abs}}{M_{w,cc}}\right)^{\alpha_{PE}} - 1 \quad \text{(Eq. 11)}$$

wherein $IV_w$ is the measured intrinsic viscosity, $IV_{cc}$ is the intrinsic viscosity from the conventional calibration, $M_{w,abs}$ is the measured absolute weight average molecular weight, and $M_{w,cc}$ is the weight average molecular weight from the conventional calibration. The weight average molecular weight by light scattering (LS) using Equation (5) is commonly referred to as "absolute weight average molecular weight" or "$M_{w,abs}$." The $M_{w,cc}$ from Equation (2) using conventional GPC molecular weight calibration curve ("conventional calibration") is often referred to as "polymer chain backbone molecular weight," "conventional weight average molecular weight," and "$M_{w,cc}$."

All statistical values with the "cc" subscript are determined using their respective elution volumes, the corresponding conventional calibration as previously described, and the concentration (C). The non-subscripted values are measured values based on the mass detector, LALLS (Low Angle Laser Light Scattering—15 degree signal), and viscometer areas. The value of $K_{PE}$ is adjusted iteratively, until the linear reference sample has a gpcBR measured value of zero. For example, the final values for α and Log K for the determination of gpcBR in this particular case are 0.725 ($\alpha_{PE}$) and −3.391 (log $K_{PE}$), respectively, for polyethylene, and 0.722 ($\alpha_{PS}$) and −3.993 (log $K_{PS}$), respectively, for polystyrene. These polyethylene coefficients (α and K) were then entered into Equation (10).

Once the K and α values have been determined using the procedure discussed previously, the procedure is repeated using the branched samples. The branched samples are analyzed using the final Mark-Houwink constants obtained from the linear reference as the best "cc" calibration values, and Equations (2)-(10) are applied.

The interpretation of gpcBR is straight-forward. For linear polymers, gpcBR calculated from Equation (11) will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Differential Scanning Calorimetry (DSC)

DSC was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion (HO (in Joules per gram), and the calculated % crystallinity for polyethylene samples using: % Crystallinity=(($H_f$)/(292 J/g))×100.

The heat of fusion ($H_f$) and the peak melting temperature were reported from the second heat curve. Peak crystallization temperature is determined from the cooling curve.

Rheology Measurement

The test sample used in the rheology measurement was prepared from a compression molding plaque. A piece of aluminum foil was placed on a back plate, and a template or mold was placed on top of the back plate. Approximately 3.2 grams of resin was placed in the mold, and a second piece of aluminum foil was placed over the resin and mold. A second back plate was then placed on top of the aluminum foil. The total ensemble was put into a compression molding press and pressed for 6 min at 190° C. under 25000 psi. The sample was then removed and laid on the counter to cool to room temperature. A 25 mm disk was stamped out of the compression-molded plaque. The thickness of this disk was approximately 3.0 mm.

The rheology measurement to determine DMS G' (at G"=500 Pa, 170° C.) was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 2.0 mm. The sample was then allowed to remain for exactly 5 minutes at these conditions. The oven was then opened, the excess sample was carefully trimmed around the edge of the plates, and the oven was closed. The method had an additional five minute delay built in, to allow for temperature equilibrium. Then the storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale, and fitted to a $4^{th}$-order polynomial curve (log G'=a+b×log G"+c×(log G")$^2$+d×(log G")$^3$+e×(log G")$^4$, where a, b, c, d and e are constants determined by the least square fitting method). G' (at G"=500 Pa, 170° C.) was obtained from the fitted equation.

The rheology measurement to determine the viscosity at 0.1 rad/s, the viscosity at 100 rad/s, tan delta at 0.1 rad/s, tan delta at 100 rad/s, and G' (at G"=5 kPa, 190° C.) was done in a nitrogen environment, at 190° C., and a strain of 10%. The stamped-out disk was placed between the two "25 mm" parallel plates located in an ARES-1 (Rheometrics SC) rheometer oven, which was preheated, for at least 30 minutes, at 190° C., and the gap of the "25 mm" parallel plates was slowly reduced to 2.0 mm. The sample was then allowed to remain for exactly 5 minutes at these conditions. The oven was then opened, the excess sample was carefully trimmed around the edge of the plates, and the oven was closed. The method had an additional five minute delay built in, to allow for temperature equilibrium. Then the viscosity at 0.1 rad/s, viscosity at 100 rad/s, tan delta at 0.1 rad/s and tan delta at 100 rad/s were measured via a small amplitude, oscillatory shear, according to an increasing frequency sweep from 0.1 to 100 rad/s. The complex viscosity η*, tan (δ) or tan delta, viscosity at 0.1 rad/s (V0.1), the viscosity at 100 rad/s (V100), and the viscosity ratio (V0.1/V100) were calculated from these data.

For G' (at G"=5 kPa, 190° C.), the data were plotted (G' (Y-axis) versus G" (X-axis)) on a log-log scale, and fitted to a $4^{th}$-order polynomial curve (log G'=a'+b'×log G"+c'×(log G")$^2$+d'×(log G")$^3$+e'×(log G")$^4$, where a', b', c', d' and e' are constants determined by the least square fitting method). G' (at G"=5 kPa, 190° C.) was obtained from the fitted equation Melt Strength Melt strength was measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2.0 mm. The pellets (20-30 gram pellets) were fed into the barrel (length=300 mm, diameter=12 mm), compressed and allowed to melt for 10 minutes before being extruded at a constant piston speed of 0.265 mm/s, which corresponds to a wall shear rate of 38.2 s$^{-1}$ at the given die diameter. The extrudate passed through the wheels of the Rheotens located 100 mm below the die exit and was pulled by the wheels downward at an acceleration rate of 2.4 mm/s$^2$. The force (in cN) exerted on the wheels was recorded as a function of the velocity of the wheels (in mm/s). Melt strength is reported as the plateau force (cN) before the strand broke.

Standard Method for Hexane Extractables

Hexane Extractables—Polymer pellets (from the polymerization pelletization process without further modification; approximately 2.2 grams (pellets) per press) were pressed in a Carver Press at a thickness of 2.5-3.5 mils. The pellets were pressed at 190° C. and 3000 lbf for three minutes, and then at 190° C. and 40000 lbf for another three minutes. Non-residue gloves (PIP* CleanTeam* CottonLisle Inspection Gloves, Part Number: 97-501) were worn to prevent contamination of the films with residual oils from the hands of the operator. Films were cut into "1-inch by 1-inch" squares, and weighed (2.5±0.05 g). The films were extracted for two hours, in a hexane vessel, containing about 1000 ml of hexane, at 49.5±0.5° C., in a heated water bath. The hexane used was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.), at full vacuum (ISOTEMP Vacuum Oven, Model 281A, at approximately 30 inches Hg) for two hours. The films were then place in a desiccators, and allowed to cool to room temperature for a minimum of one hour. The films were then reweighed, and the amount of mass loss due to extraction in hexane was calculated. This method was based on 21 CRF 177.1520 (d)(3)(ii), with one deviation from FDA protocol by using hexanes instead of n-hexane.

Extrusion Coating

All coating experiments were performed on a Black-Clawson Extrusion Coating Line. The extruder was equipped with a 3½ inch, 30:1 L/D, 4:1 compression ratio single flight screw with two spiral Mattock mixing sections. The nominal die width of 91 cm (36 inches) was deckled (metal dam to block the flow in the die at the die exit around the outer edges of the die, and used to decrease the die width, and thus decrease the polymer flow out of the die) to an open die width of 61 cm (24 inches). In extrusion coating, a deckle is a die insert that sets the coating width of a slot die coater or the extrusion width of an extrusion die. It work by constraining the flow as the material exits the die.

Die gap was 25 mil, and the air gap was *15 cm (6 inches). Blends of the various components were produced by weighing out the pellets, and then tumble blending samples, until a homogeneous blend was obtained (approximately 30 minutes for each sample). The temperatures in each zone of the extruder were 177, 232, 288, and 316° C.(die) (350, 450, 550 and 600° F. (die)), respectively, leading to a target melt temperature of 316° C. (600° F.). The screw speed was 90 rpm, resulting in 250 lb/hr output rate. Line speed was at 440 ft/min (fpm) resulting in a 1 mil coating onto a 50 lb/ream KRAFT paper (the width of the KRAFT paper was 61 cm (24 inches); unbleached). The coated paper was used for heat seal testing (polymer coating/KRAFT paper configuration). In order to obtain a piece of polymer film for the water vapor transmission rate (WVTR) test, a piece of release liner (width of release liner about 61 cm was inserted between the polymer coating and the paper substrate before the molten polymer curtain touched the paper substrate, to form a "polymer coating/release liner/KRAFT paper" configuration. The solidified polymer coatings were then released from the release liner for the WVTR test.

The amount of neck-in (the difference in actual coating width versus deckle width (61 cm)) was measured at line speeds of 440 feet per min and 880 feet per minute (fpm), resulting in a "1 mil" and a "0.5 mil" coating thickness, respectively. Amperage and Horse Power of the extruder were recorded. The amount of backpressure was also recorded for each polymer, without changing the back pressure valve position. Draw down is the speed at which edge imperfections on the polymer coating (typically the width of the polymer coating oscillating along the edges of the polymer coating) were noticed, or that speed at which the molten curtain completely tears from the die. Although the equipment is capable of haul-off speeds of 3000 fpm, for these experiments the maximum speed used was 1500 fpm. Draw down was measured at 90 rpm screw speed. If no imperfections and/or polymer tear were observed at 1500 fpm, the output rate was reduced by slowing the screw speed down to 45 rpm. The reduced rate draw down was then recorded at 45 rpm screw speed. Extrusion coating results are shown in the experimental section.

Water Vapor Transmission Rate (WVTR)

Polymer films released from the release liner, prepared from the extrusion coating experiment at 440 fpm, were used for WVTR study. Films were cut into "9 cm×10 cm" test sample. Each polymer coating was around 1 mil in thickness. WVTR was measured with a Mocon W3/33 according to ASTM F1249-06, at 38° C., with 100% relative humidity (RH). The average value of two replicates was reported. WVTR results are shown in below in the experimental section.

Heat Seal

The coated paper obtained from extrusion coating experiment, at 440 fpm was used for heat seal test. The polymer coating layer thickness was around 1 mil. Each coated paper for this study was conditioned for 40 hours in ASTM conditions (23±2° C. and 50±10% relative humidity). For each composition, two coated paper sheets were placed together, with the polymer coating on one sheet in contact with the polymer coating of the other sheet (paper/polymer coating/polymer coating/paper configuration) to form a pre-sealed sheet.

Each samples was sealed with Kopp Heat Sealer using a standard sealing temperatures ranging from 80° C. to 150° C., in 10° C. increments, to form a heat sealed sample sheet. The width of the seal bar was 5 mm Each pre-sealed sheet was sealed in the cross direction at 39 psi, with a dwell time of 0.5 sec, to form a sealed sample sheet.

Each sealed sample sheet was cut into "1 inch width" strips using a compressed air sample cutter, along the machine direction of the sheet, to form five test specimens. Each test specimen had a width of one inch, and a length of four inches. A bonded area of "1 inch×5 mm" was located at distance of about one inch from one end of the test specimen.

Figure 6:
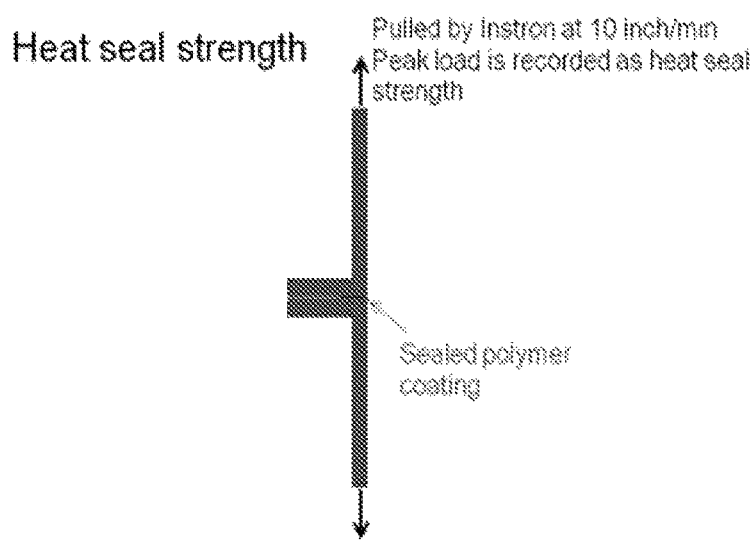
FIG. 6 depicts the test sample configuration in the MTS Universal Tensile Testing Machine for the Heat Seal Study.

Each test sample was then conditioned for 40 hours (in ASTM conditions (23±2° C. and 50±10% relative humidity)) before being tested. Each sample was tested using an MTS Universal Tensile Testing Machine with a 50 lb load cell, and was pulled at a rate of 10 in/min, until failure. See FIG. 6—free ends of each test sample, further from the bonded area, were clamped into the MTS Universal Tensile Testing Machine. Test temperature and peak load average (from five replicate test samples) per sealing temperature were reported.

EXPERIMENTAL

I. Resins and Material
LDPE-1

For LDPE-1, the polymerization was carried out in tubular reactor with four reaction zones. In each reaction zone, pressurized water was used for cooling and/or heating the reaction medium, by circulating this water countercurrent through the jacket of the reactor. The inlet-pressure was 2150 bar. The ethylene throughput was about 45 t/h. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer. The non-converted ethylene, and other gaseous components in the reactor outlet, were recycled through a high pressure and a low pressure recycles, and were compressed through a booster, a primary and a hyper (secondary) compressor. Organic peroxides (see Table 1) were fed into each reaction zone. For this polymerization, both propionaldehyde (PA) and n-butane were used as a chain transfer agent, and were present in each reaction zone. The ethylene rich reactor feed streams contain even concentrations of the applied chain transfer agents.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream, containing organic peroxide for re-initiation. At the end of the second reaction zone, to enable further polymerization in the third reaction zone, organic peroxides were fed. This process was repeated at the end of the third reaction zone, to enable further polymerization in the fourth reaction zone. The polymer was extruded and pelletized (about 30 pellets per gram), using a single screw extruder design, at a melt temperature around 230-250° C. The weight ratio of the ethylene-rich feed streams in the four reaction zones was X:(1.00−X):0.00: 0.00, where X is the weight fraction of the overall ethylene rich feed stream, X is specified in Table 3 as "Ethylene to the front/wt %". The internal process velocity was approximately 15, 13, 12 and 12 m/sec for respectively the 1st, 2nd, 3rd and 4th reaction zone. Additional information can be found in Tables 2 and 3.

TABLE 1

| Initiators for the LDPE-1 | |
| --- | --- |
| Initiator | Abbreviation |
| tert-Butyl peroxy-2-ethyl hexanoate | TBPO |
| Di-tert-butyl peroxide | DTBP |

TABLE 2

| Pressure and Temperature Conditions for the LDPE-1 | | | | | | | | |
| --- | --- | --- | --- | --- | --- | --- | --- | --- |
| | Inlet-pressure/bar | Start-temp./° C. | Reinitiation temp. 2nd zone/° C. | Reinitiation temp. 3rd zone/° C. | Reinitiation temp. 4rd zone/° C. | 1st Peak temp./° C. | 2nd Peak temp./° C. | 3rd Peak temp./° C. | 4th Peak temp./° C. |
| LDPE-1 | 2150 | 152 | 183 | 248 | 253 | 319 | 314 | 314 | 301 |

TABLE 3

| Additional Information of LDPE-1 | | | | |
| --- | --- | --- | --- | --- |
| | Peroxides | CTA | Make-up flow ratio by weight PA/n-butane | Ethylene to the front/wt % |
| LDPE-1 | TBPO/DTBP | PA/n-butane | 1.0 | 47 |

HDPE 1-5

For HDPE-1 through HDPE-5, all raw materials (monomer and comonomer) and the process solvent (a narrow boiling range, high-purity isoparaffinic solvent) were purified with molecular sieves, before introduction into the reaction environment. Hydrogen was supplied in pressurized cylinders, as a high purity grade, and was not further purified. The reactor monomer feed stream was pressurized, via a mechanical compressor, to above reaction pressure. The solvent and comonomer feed was pressurized, via a pump, to above reaction pressure. The individual catalyst components were manually batch diluted with purified solvent, and pressured to above reaction pressure. All reaction feed flows were measured with mass flow meters, and independently controlled with computer automated valve control systems. The fresh comonomer feed (if required) was mechanically pressurized and injected into the feed stream for the reactor.

The continuous solution polymerization reactor consisted of a liquid full, non-adiabatic, isothermal, circulating, loop reactor, which is similar a continuously stirred tank reactor (CSTR) with heat removal. Independent control of all fresh solvent, monomer, comonomer, hydrogen, and catalyst component feeds was possible. The total fresh feed stream to the reactor (solvent, monomer, comonomer, and hydrogen) was temperature controlled, by passing the feed stream through a heat exchanger. The total fresh feed to the polymerization reactor was injected into the reactor at two locations, with approximately equal reactor volumes between each injection location. The fresh feed was controlled, with each injector receiving half of the total fresh feed mass flow.

The catalyst components were injected into the polymerization reactor, through a specially designed injection stinger, and were combined into one mixed catalyst/cocatalyst feed stream, prior to injection into the reactor. The primary catalyst component feed was computer controlled, to maintain the reactor monomer conversion at a specified target. The cocatalyst components were fed, based on calculated specified molar ratios to the primary catalyst component Immediately following each fresh injection location (either feed or catalyst), the feed streams were mixed, with the circulating polymerization reactor contents, with static mixing elements. The contents of the reactor were continuously circulated through heat exchangers, responsible for removing much of the heat of reaction, and with the temperature of the coolant side, responsible for maintaining an isothermal reaction environment at the specified temperature. Circulation around the reactor loop was provided by a pump. The final reactor effluent entered a zone, where it was deactivated with the addition of, and reaction with, a suitable reagent (water). At this same reactor exit location, other additives may also be added.

Following catalyst deactivation and additive addition, the reactor effluent entered a devolatization system, where the polymer was removed from the non-polymer stream. The isolated polymer melt was pelletized and collected. The non-polymer stream passed through various pieces of equipment, which separate most of the ethylene, which was removed from the system. Most of the solvent and unreacted comonomer was recycled back to the reactor, after passing through a purification system. A small amount of solvent and comonomer was purged from the process. The process conditions in the reactor are summarized in Table 4 and Table 5.

TABLE 4

Catalyst information

| | CAS name |
|---|---|
| Cat. A | (tert-butyl(dimethyl(3-(pyrrolidin-1-yl)-1H-inden-1-yl)silyl)amino)dimethyltitanium |
| Co-Cat. B | Amines, bis(hydrogenated tallow alkyl)methyl, tetrakis(pentafluorophenyl)borate(1-) |
| Co-Cat. C | Aluminoxanes, iso-Bu Me, branched, cyclic and linear; modified methyl 3A aluminoxane |

TABLE 5

Process conditions to produce high density polyethylenes

| Sample # | Units | HDPE-1 | HDPE-2 | HDPE-3 | HDPE-4 | HDPE-5 |
|---|---|---|---|---|---|---|
| Reactor Configuration | | Single Reactor | Single Reactor | Single Reactor | Single Reactor | Single Reactor |
| Comonomer | | 1-octene | none | none | none | none |
| Reactor Total Solvent Flow | lb/hr | 2746 | 1986 | 2777 | 2381 | 2775 |
| Reactor Total Ethylene Flow | lb/hr | 407 | 391 | 413 | 354 | 411 |
| Reactor Total Comonomer Flow | lb/hr | 18 | 0 | 0 | 0 | 0 |
| Reactor Hydrogen Feed Flow | SCCM | 9088 | 8498 | 19067 | 4659 | 8998 |
| Reactor Control Temperature | °C. | 142 | 167 | 160 | 150 | 150 |
| Reactor Ethylene Conversion | % | 85.5 | 89.9 | 85.3 | 85.5 | 84.1 |
| Reactor Viscosity | centi-Poise | 82 | 10 | 8 | 223 | 66 |
| Reactor Catalyst | type | Cat. A | Cat. A | Cat. A | Cat. A | Cat. A |
| Reactor Co-catalyst 1 | type | Co-Cat. B | Co-Cat. B | Co-Cat. B | Co-Cat. B | Co-Cat. B |
| Reactor Co-catalyst 2 | type | Co-Cat. C | Co-Cat. C | Co-Cat. C | Co-Cat. C | Co-Cat. C |
| Reactor Catalyst Efficiency | g Polymer/g catalyst metal | 5452000 | 865000 | 3239000 | 6362000 | 4956000 |
| Reactor Cocatalyst to Catalyst Metal Molar Ratio | Ratio | 1.4 | 1.1 | 1.4 | 1.4 | 1.4 |
| Reactor Scavenger to Catalyst Metal Molar Ratio | Ratio | 8.0 | 5.0 | 8.0 | 8.0 | 8.0 |

Polymers are typically stabilized with minor amounts (ppm) of one or more stabilizers. Polymers, and associated properties, are listed in Tables 6 and 7 below.

TABLE 6

Density and Melt Index of LDPE resins and HDPE Resins

| | Density (g/cc) | I2 (g/10 min) | I10 (g/10 min) | DMS G'(at G" = 5 kPa) (Pa) @ 190° C. | DMS G'(at G" = 500 Pa) (Pa) @ 170° C. |
|---|---|---|---|---|---|
| LDPE-1 (tubular) | 0.9194 | 6.9 | 81.9 | 3500 | 129 |
| LDPE-2 (tubular)* | 0.9192 | 4.6 | NM | 3908 | 156 |
| AGILITY EC 7000 (tubular) | 0.9190 | 3.9 | NM | 3936 | 156 |
| HDPE-1 | 0.9462 | 4.3 | 24.9 | NM | NM |
| HDPE-2 | 0.9563 | 20.2 | 133 | NM | NM |
| HDPE-3 | 0.9654 | 62 | 384 | NM | NM |
| HDPE-4 | 0.9567 | 1.0 | 6.4 | NM | NM |
| HDPE-5 | 0.9576 | 4.9 | 28.42 | NM | NM |
| HDPE-6* | 0.9543 | 9.8 | NM | NM | NM |

TABLE 6-continued

Density and Melt Index of LDPE resins and HDPE Resins

|  | Density (g/cc) | I2 (g/10 min) | I10 (g/10 min) | DMS G'(at G" = 5 kPa) (Pa) @ 190° C. | DMS G'(at G" = 500 Pa) (Pa) @ 170° C. |
|---|---|---|---|---|---|
| HDPE-7* | 0.9571 | 2.0 | NM | NM | NM |
| HDPE 10462N | 0.9630 | 10 | NM | NM | NM |

*LDPE-2 is a melt blend of AGILITY EC 7000 and LDPE-1 in 50%/50% by weight.
*HDPE-6 is a melt blend of HDPE-1 and HDPE-2 in 40%/60% by weight.
*HDPE-7 is a melt blend of HDPE-4 and HDPE-5 in 50%/50% by weight.
NM = Not Measured

TABLE 7

Molecular Weights and Molecular Weight Distribution of the HDPE resins - conventional calibration from Triple Detector GPC

|  | $M_{n, cc}$ (g/mol) | $M_{w, cc}$ (g/mol) | $M_{z, cc}$ (g/mol) | $M_{w, cc}/M_{n, cc}$ |
|---|---|---|---|---|
| HDPE-1 | 34,134 | 72,540 | 125,343 | 2.13 |
| HDPE-2 | 19,654 | 46,383 | 83,398 | 2.36 |
| HDPE-3 | 16,855 | 36,643 | 61,025 | 2.17 |
| HDPE-4 | 48,112 | 104,138 | 184,869 | 2.16 |
| HDPE-6 | 21,423 | 51,564 | 95,630 | 2.41 |
| HDPE-7 | 40,163 | 87,777 | 159,201 | 2.19 |
| HDPE 10462N | 19,369 | 63,741 | 215,413 | 3.29 |

II. Compositions

Melt blend samples (compositions) were generated in a 30 mm co-rotating, intermeshing Coperion Werner-Pfleiderer ZSK-30 twin screw extruder. The ZSK-30 had ten barrel sections, with an overall length of 960 mm and an L/D ratio of 32. The extruder consisted of a DC motor, connected to a gear box by V-belts. The 15 hp (11.2 kW) motor was powered by a GE adjustable speed drive, located in the control cabinet. The control range of the screw shaft speed was 1:10. The maximum extruder screw speed was 500 rpm. The extruder itself had eight (8) heated/cooled barrel sections, along with a 30 mm spacer, which made up five temperature controlled zones. It had a cooled only feed section, and a heated only die section, which was held together by tie-rods and supported on the machine frame. Each section could be heated electrically with angular half-shell heaters, and cooled by a special system of cooling channels. The screws consisted of continuous shafts, on which screw-flighted components and special kneading elements were installed, in any required order. The elements were held together radially by keys and keyways, and axially by a screwed-in screw tip. The screw shafts were connected to the gear-shafts by couplings, and could easily be removed from the barrels for dismantling. The melt blends were pelletized for GPC, DSC, melt index, density, rheology, melt strength, and hexene extractable characterization. The compositions are shown in Tables 8-11. Some composition properties are listed in Tables 12-18 below. DSC profiles are shown in FIGS. 1-4. Additional properties are discussed in Studies 1-3 below.

TABLE 8

Compositions (Study 1)

|  | First Composition | Second Composition | First Composition wt % | Second Composition wt % |
|---|---|---|---|---|
| Sample 1 Comp. | Agility EC 7000 | — | 100 | — |
| Sample 2 | Agility EC 7000 | HDPE-1 | 85 | 15 |
| Sample 3 | Agility EC 7000 | HDPE-6 | 85 | 15 |
| Sample 4 | Agility EC 7000 | HDPE-6 | 80 | 20 |
| Sample 5 | Agility EC 7000 | HDPE-2 | 85 | 15 |
| Sample 6 | Agility EC 7000 | HDPE-3 | 80 | 20 |

TABLE 9

Additional Compositions (Study 2)

|  | First Composition | Second Composition | First Composition wt % | Second Composition wt % |
|---|---|---|---|---|
| Sample 9 Comp. | LDPE-1 | — | 100 | — |
| Sample 10 | LDPE-1 | HDPE-7 | 85 | 15 |
| Sample 11 | LDPE-1 | HDPE-1 | 85 | 15 |
| Sample 12 | LDPE-1 | HDPE-6 | 85 | 15 |
| Sample 13 | LDPE-1 | HDPE-2 | 85 | 15 |

TABLE 10

Additional Compositions (see Study 2)

|  | First Ethylene-based Polymer | Second Composition | First Composition wt % | Second Composition wt % |
|---|---|---|---|---|
| Sample 7 | LDPE-2 | HDPE-2 | 85 | 15 |
| Sample 8 | LDPE-2 | HDPE-3 | 85 | 15 |

TABLE 11

Additional Compositions (Study 3)

|  | First Composition | Second Component | First Composition wt % | Second Composition wt % | ratio of I2 ($2^{nd}$ comp) to I2 ($1^{st}$ ethylene-based polymer) |
|---|---|---|---|---|---|
| Sample 14 Comparative | Agility EC 7000 | — | 100 | — | — |
| Sample 15 Comparative | Agility EC 7000 | HDPE 10462N | 98 | 2 | 2.63 |
| Sample 16 | Agility EC 7000 | HDPE 10462N | 85 | 15 | 2.63 |
| Sample 17 comparative | Agility EC 7000 | HDPE 10462N | 60 | 40 | 2.63 |
| Sample 18 Comparative | Agility EC 7000 | HDPE 10462N | 20 | 80 | 2.63 |
| Sample 19 | Agility EC 7000 | HDPE-4 | 85 | 15 | 0.26 |

TABLE 12

Properties of the Compositions

| | Density (g/cc) | I2 (g/10 min) | I10 (g/10 min) | Ratio of I2(2nd comp) to I2 (1st comp.) 0.50 to 2.70 | Ratio of I2 (comp) to I2 (second comp) 0.30 to 2.60 | Ratio of I2(comp) to I2 (1st comp.) 0.50 to 3.00 | Hexane Extractable (wt %) |
|---|---|---|---|---|---|---|---|
| Sample 1 Comp. | 0.919 | 3.9 | 46.4 | — | — | — | 3.79 |
| Sample 2 | 0.9246 | 3.0 | 32.7 | 1.10 | 0.70 | 0.78 | Not measured |
| Sample 3 | 0.925 | 3.8 | 38.2 | 2.56 | 0.39 | 0.96 | Not measured |
| Sample 4 | 0.9265 | 6.4 | 61.7 | 2.56 | 0.65 | 1.65 | 2.48 |
| Sample 5 | 0.925 | 4.9 | 54.0 | 5.13 | 0.24 | 1.25 | Not measured |
| Sample 6 | 0.9273 | 11.1 | 107.6 | 15.38 | 0.18 | 2.83 | 2.47 |
| Sample 7 | 0.9244 | 5.2 | 53.4 | 4.35 | 0.26 | 1.13 | 2.77 |
| Sample 8 | 0.9252 | 6.5 | 66.3 | 13.48 | 0.11 | 1.42 | 2.70 |

TABLE 13

Properties of Compositions

| | Density (g/cc) | I2 (g/10 min) | I10 (g/10 min) | Ratio of I2(2nd comp) to I2 (1st comp.) 0.50 to 2.70 | Ratio of I2 (comp) to I2 (2nd comp.) 0.30 to 2.60 | Ratio of I2(comp) to I2 (1st comp.) 0.50 to 3.00 | Hexane Extractable (wt %) |
|---|---|---|---|---|---|---|---|
| Sample 9 Comp. | 0.9194 | 6.9 | 81.9 | — | — | — | 3.32 |
| Sample 10 | 0.9246 | 4.0 | 41.8 | 0.29 | 2.00 | 0.58 | 2.67 |
| Sample 11 | 0.924 | 4.9 | 51.4 | 0.62 | 1.14 | 0.71 | Not measured |
| Sample 12 | 0.9243 | 6.4 | 68.5 | 1.45 | 0.65 | 0.93 | Not measured |
| Sample 13 | 0.9253 | 7.7 | 76.1 | 2.90 | 0.38 | 1.11 | 2.57 |

TABLE 14

DSC Results of the Compositions

| | Heat of crystallization (J/g) | Tc1 (° C.) | Tc2 (° C.) | Tc3 (° C.) | Heat of fusion | Tm1 (° C.) | Tm2 (° C.) | Tm3 (° C.) |
|---|---|---|---|---|---|---|---|---|
| Sample 1 | 138.1 | 55 | 95 | | 138.3 | 107.2 | | |
| Sample 2 | 152.4 | 56.7 | 96.8 | 112.3 | 153.1 | 105.8 | 123.8 | |
| Sample 3 | 155.7 | 56.7 | 95.5 | 113 | 153.3 | 105.8 | 123.8 | 125.5 |
| Sample 4 | 155.7 | 57.2 | 95.8 | 110.5 | 157.9 | 105.5 | 123.5 | 126.3 |
| Sample 6 | 158.7 | 57.2 | 95 | 115.8 | 160.3 | 105.8 | 126.8 | 128.0 |
| Sample 7 | 152.9 | 57.2 | 95.8 | 110.8 | 155.4 | 105.5 | 122.8 | 126.3 |
| Sample 8 | 152.6 | 56.5 | 95 | 112 | 154.4 | 105.5 | 123.3 | 127.5 |

TABLE 15

DSC Results of the Compositions

| | Heat of crystallization (J/g) | Tc1 (° C.) | Tc2 (° C.) | Tc3 (° C.) | Heat of fusion | Tm1 (° C.) | Tm2 (° C.) | Tm3 (° C.) |
|---|---|---|---|---|---|---|---|---|
| Sample 9 | 138.7 | 55 | 95.3 | | 139.2 | 107.5 | | |
| Sample 10 | 155.2 | 56.7 | 95.5 | 113.5 | 153.7 | 106.0 | 125.0 | 127.8 |
| Sample 13 | 153.6 | 56.5 | 95.8 | 110.5 | 156.5 | 105.5 | 122.3 | 126.3 |

TABLE 16

Melt Strength and DMS Properties of the Compositions

| | Melt strength (cN) | Velocity @break (mm/s) | DMS at 190° C. | | | | | G' (at G" = 5 kPa, 190° C.) (Pa) | DMS at 170° C. DMS G' (at G" = 500 Pa) (Pa) |
|---|---|---|---|---|---|---|---|---|---|
| | | | DMS viscosity (V) at 0.1 rad/s (Pa · s) | DMS viscosity (V) at 100 rad/s (Pa · s) | Ratio of V at 0.1 rad/s to V at 100 rad/s | tan delta at 0.1 rad/s | tan delta at 100 rad/s | | |
| Sample 1 | 10.1 | 342 | 4873 | 315 | 15.5 | 3.574 | 0.849 | 3956 | 156 |
| Sample 2 | 12.7 | 365 | 5746 | 426 | 13.5 | 3.391 | 0.980 | 3513 | 154 |

TABLE 16-continued

Melt Strength and DMS Properties of the Compositions

| | | | | DMS at 190° C. | | | | |
|---|---|---|---|---|---|---|---|---|
| | Melt strength (cN) | Velocity @break (mm/s) | DMS viscosity (V) at 0.1 rad/s (Pa·s) | DMS viscosity (V) at 100 rad/s (Pa·s) | Ratio of V at 0.1 rad/s to V at 100 rad/s | tan delta at 0.1 rad/s | tan delta at 100 rad/s | G' (at G" = 5 kPa, 190° C.) (Pa) | DMS at 170° C. DMS G' (at G" = 500 Pa) (Pa) |
| Sample 3 | 8.9 | 407 | 3484 | 304 | 11.5 | 4.578 | 1.009 | 3575 | 157 |
| Sample 4 | 5.7 | 365 | 2307 | 297 | 7.8 | 6.917 | 1.136 | 3058 | 119 |
| Sample 5 | 11.2 | 344 | 4648 | 365 | 12.7 | 3.569 | 0.994 | 3538 | 144 |
| Sample 6 | 3.9 | 595 | 1418 | 213 | 6.7 | 9.217 | 1.186 | 3197 | 122 |
| Sample 7 | 9.6 | 334 | 3246 | 283 | 11.5 | 4.056 | 1.009 | 3646 | 158 |
| Sample 8 | 8.5 | 325 | 2707 | 246 | 11.0 | 4.348 | 1.023 | 3729 | 159 |

TABLE 17

Melt Strength and DMS Properties of the Compositions

| | | | | DMS at 190° C. | | | | |
|---|---|---|---|---|---|---|---|---|
| | Melt strength (cN) | Velocity @break (mm/s) | DMS viscosity (V) at 0.1 rad/s (Pa·s) | DMS viscosity (V) at 100 rad/s (Pa·s) | Ratio of V at 0.1 rad/s to V at 100 rad/s | tan delta at 0.1 rad/s | tan delta at 100 rad/s | G' (at G" = 5 KPa) (Pa) | DMS at 170° C. DMS G'(at G" = 500 Pa) (Pa) |
| Sample 9 | 4.8 | 333 | 2419 | 253 | 9.6 | 6.404 | 0.966 | 3500 | 129 |
| Sample 10 | 8.5 | 388 | 3795 | 386 | 9.8 | 5.015 | 1.026 | 3120 | 123 |
| Sample 11 | 7.1 | 411 | 3031 | 349 | 8.7 | 5.882 | 1.086 | 3063 | 120 |
| Sample 12 | 4.5 | 341 | 1922 | 261 | 7.4 | 8.262 | 1.142 | 3102 | 118 |
| Sample 13 | 5.0 | 438 | 2046 | 263 | 7.8 | 7.375 | 1.115 | 3175 | 124 |

TABLE 18

GPC Data of the Compositions

| | Conventional Calibration using Triple Detector GPC | | | | LS Calibration using Triple Detector GPC (except for Mw(LS-abs)/Mn(cc-GPC)) | | | | Intrinsic Viscosity and gpcBR | | | |
|---|---|---|---|---|---|---|---|---|---|---|---|---|
| | $M_{n,cc}$ (g/mol) | $M_{w,cc}$ (g/mol) | $M_{z,cc}$ (g/mol) | $M_{w,cc}/M_{n,cc}$ | $M_{w,abs}$ (g/mol) | $M_{z,abs}$ (g/mol) | $M_{z,abs}/M_{w,abs}$ | $M_{w,abs}/M_{n,cc}$ | $IV_{cc}$ (dl/g) | $IV_w$ (dl/g) | gpcBR | $IV_{cc}/IV_W$ |
| Sample 1 | 12623 | 120826 | 470549 | 9.57 | 269438 | 3410039 | 12.7 | 21.3 | 1.783 | 0.920 | 2.477 | 1.938 |
| Sample 2 | 14259 | 118012 | 468696 | 8.28 | 249665 | 2934571 | 11.8 | 17.5 | 1.765 | 0.991 | 2.063 | 1.780 |
| Sample 3 | 13231 | 111727 | 466288 | 8.44 | 241362 | 3198884 | 13.3 | 18.2 | 1.686 | 0.938 | 2.155 | 1.797 |
| sample 4 | 13393 | 96480 | 454481 | 7.20 | 242443 | 4480334 | 18.5 | 18.1 | 1.517 | 0.888 | 2.330 | 1.708 |
| sample 6 | 12422 | 92954 | 460538 | 7.48 | 241313 | 4758133 | 19.7 | 19.4 | 1.463 | 0.830 | 2.556 | 1.763 |
| sample 7 | 13776 | 111091 | 550571 | 8.06 | 273014 | 3801713 | 13.9 | 19.8 | 1.653 | 0.916 | 2.482 | 1.804 |
| sample 8 | 12636 | 111394 | 563063 | 8.82 | 279798 | 3862350 | 13.8 | 22.1 | 1.646 | 0.889 | 2.625 | 1.851 |
| sample 9 | 12012 | 103886 | 480394 | 8.65 | 280797 | 5225538 | 18.6 | 23.4 | 1.585 | 0.836 | 2.923 | 1.896 |
| sample 10 | 13516 | 104831 | 469161 | 7.76 | 266900 | 4645957 | 17.4 | 19.7 | 1.612 | 0.930 | 2.437 | 1.734 |
| sample 13 | 13623 | 97329 | 461965 | 7.14 | 251696 | 4379034 | 17.4 | 18.5 | 1.521 | 0.870 | 2.498 | 1.748 |

Study 1—Extrusion Coating and Heat Seal Strength

The extrusion coating properties and heat seal properties were examined for Samples 1C and 2-6. See Table 8 above. Results are shown in Tables 19-21.

TABLE 19

Extrusion Coating Results (Study 1)

|  | Neck-in at 440 fpm (inch) | Neck-in at 880 fpm (inch) | Draw Down (fpm) | Reduced Rate Draw Down (fpm) | Horse Power (HP) of motor that drives the single screw | Current (amperage) | MELT Temperature (deg. F.) | Pressure (psi) |
|---|---|---|---|---|---|---|---|---|
| Sample 1 | 2.000 | 1.75  | NB | Not tested | 22 | 118 | 601 | 1074 |
| Sample 2 | 2.125 | 1.875 | NB | Not tested | 28 | 126 | 605 | 1502 |
| Sample 3 | 2.125 | 1.75  | NB | 1150 | 25 | 123 | 604 | 1300 |
| Sample 4 | 2.125 | 1.875 | NB | 1243 | 25 | 128 | 603 | 1393 |
| Sample 5 | 2.125 | 1.875 | NB | 1349 | 24 | 121 | 602 | 1188 |
| Sample 6 | 2.125 | 1.875 | NB | 1386 | 23 | 124 | 600 | 1050 |

*NB = Extrudate did not break at the maximum line speed (1500 fpm).

TABLE 20

Heat Seal Strength of each Composition (Study 1)

Heat Seal Strength (lbs) Mean ± SD (n = 5)
Sealing Temp.

|  | 80° C. | 90° C. | 100° C. | 110° C. | 120° C. | 130° C. | 140° C. | 150° C. |
|---|---|---|---|---|---|---|---|---|
| Sample 1 comp. | 0 | 1.3 ± 0.8 | 3.0 ± 0.3 | 3.2 ± 0.4 | 3.2 ± 0.7 | 3.1 ± 0.6 | 3.3 ± 0.5 | 3.2 ± 0.6 |
| Sample 2 | 0 | 0 | 1.9 ± 0.6 | 2.8 ± 0.3 | 3.0 ± 0.2 | 2.9 ± 0.4 | 3.4 ± 0.4 | 3.0 ± 0.6 |
| Sample 3 | 0 | 0 | 1.9 ± 0.5 | 2.6 ± 0.3 | 2.6 ± 0.4 | 2.4 ± 0.1 | 2.9 ± 0.3 | 3.1 ± 0.5 |
| Sample 4 | 0 | 0.1 ± 0 | 1.8 ± 0.3 | 2.5 ± 0.2 | 2.3 ± 0.4 | 2.8 ± 0.2 | 3.1 ± 0.6 | 3.5 ± 0.4 |
| Sample 5 | 0 | 0 | 1.6 ± 0.3 | 2.2 ± 0.2 | 2.3 ± 0.3 | 2.6 ± 0.3 | 2.4 ± 0.3 | 2.7 ± 0.2 |
| Sample 6 | 0 | 0 | 0.4 ± 0.1 | 1.0 ± 0.3 | 1.2 ± 0.3 | 1.3 ± 0.3 | 1.6 ± 0.2 | 2.0 ± 0.2 |

Samples 2-6, each contain the same LDPE (AGILITY EC 7000), and also contain a minor amount of a HDPE resin. These samples show good extrusion coating performance (relatively low neck-in values and relative high draw down values). However, it has been discovered that Samples 2-4 show better "heat seal strength," especially at temperatures greater than, or equal to, 110° C., indicating that when the melt index (I2) ratio of the "HDPE (the second composition)" to the "LDPE (first composition)" is from 0.50 to 2.70, a higher heat seal strength results. It is postulated that this ratio range provides a faster inter-diffusion rate for polymer molecules at the sealed interface during the heat seal process. If the melt index ratio is less than, 0.50, than the drawn down value would begin to decrease (for example, see Table 19). Sample 1 does not have HDPE, and has a higher WVTR (worse barrier) than the inventive Samples 2-6, as shown in Table 21.

TABLE 21

WVTR of each Composition

| | Sample | | | | | |
|---|---|---|---|---|---|---|
| | Sample 1 | Sample 2 | Sample 3 | Sample 4 | Sample 5 | Sample 6 |
| WVTR [g · mil/ (100 in² · day)] | 1.81 ± 0.02 | 1.63 ± 0.13 | 1.57 ± 0.04 | 1.62 ± 0.11 | 1.47 ± 0.04 | 1.38 ± 0.15 |

WVTR mean +/− SD

Study 2—Extrusion Coating and Heat Seal Strength

The extrusion coating properties and heat seal properties were examined for Samples 9C and 10-13. See Table 9 above. Results are shown in Tables 22-24.

TABLE 22

|  | Neck-in at 440 fpm (inch) | Neck-in at 880 fpm (inch) | Draw Down (fpm) | Reduced Rate Draw Down (fpm) | Horse Power (HP) of motor that drives the single screw | Current (amperage) | MELT Temperature (deg. F.) | Pressure (psi) |
|---|---|---|---|---|---|---|---|---|
| Sample 9 | 3.000 | 2.625 | NB | NB | 21 | 120 | 599 | 847 |
| Sample 10 | 2.625 | 2.25 | NB | 1491 | 27 | 128 | 601 | 1427 |
| Sample 11 | 2.625 | 2.25 | NB | NB | 25 | 122 | 602 | 1283 |
| Sample 12 | 2.625 | 2.25 | NB | NB | 23 | 120 | 600 | 1137 |
| Sample 13 | 2.625 | 2.25 | NB | NB* | 22 | 118 | 597 | 992 |

*NB = Extrudate did not break at the maximum line speed (1500 fpm); it is estimated that the draw down value is significantly greater than 1500 fpm.

TABLE 23

| | Heat Seal Strength (lbs) Sealing Temp. | | | | | | | |
|---|---|---|---|---|---|---|---|---|
|  | 80° C. | 90° C. | 100° C. | 110° C. | 120° C. | 130° C. | 140° C. | 150° C. |
| Sample 9 Comp. | 0 | 1.8 ± 0.8 | 2.6 ± 0.1 | 3.3 ± 0.4 | 3.3 ± 0.5 | 3.3 ± 0.5 | 3.7 ± 0.5 | 3.9 ± 0.4 |
| Sample 10 | 0 | 0 | 1.7 ± 0.4 | 2.4 ± 0.3 | 2.5 ± 0.2 | 2.8 ± 0.3 | 2.8 ± 0.4 | 2.9 ± 0.2 |
| Sample 11 | 0 | 0 | 0.7 ± 0.4 | 2.5 ± 0.2 | 2.6 ± 0.4 | 2.6 ± 0.2 | 2.9 ± 0.3 | 3.0 ± 0.3 |
| Sample 12 | 0 | 0 | 1.8 ± 0.4 | 2.4 ± 0.1 | 2.6 ± 0.2 | 2.4 ± 0.6 | 2.9 ± 0.3 | 3.1 ± 0.6 |
| Sample 13 | 0 | 0 | 0.8 ± 0.3 | 1.5 ± 0.2 | 1.5 ± 0.3 | 2.0 ± 0.2 | 1.9 ± 0.2 | 2.1 ± 0.3 |

Samples 10-13, each contain the same LDPE (LDPE-1), and also contain a minor amount of a HDPE resin. All of the samples, show good extrusion coating performance (relatively low neck-in values and relative high draw down values). However, the draw down value for Sample 10 is not as good as the drawn down values of Samples 11-13. Also, it has been discovered that Samples 10-12 show better "heat seal strength," especially at temperatures greater than, or equal to, 110° C. These results indicate that when the melt index (I2) ratio of the "HDPE (the second composition)" to the "LDPE (first ethylene-based polymer)" is from 0.50 to 2.70 (Samples 11 and 12), a better balance of extrusion coating properties and higher heat seal strength results. Sample 9 does not contain HDPE, and had a higher WVTR (worse barrier) than the inventive Samples 10-13, as shown in Table 24 below.

TABLE 24

| Sample | Sample 9 | Sample 10 | Sample 11 | Sample 12 | Sample 13 |
|---|---|---|---|---|---|
| WVTR [g · mil/(100 in² · day)] | 1.97 | 1.45 | 1.74 | 1.61 | 1.44 |

Samples 7 and 8 (both contain LDPE-2, which is a blend of AGILITY EC 7000 and LDPE-1). See Table 10 above. Each sample showed good extrusion coating performance, with neck-in values at 440 fpm around 2.38 inch, and reduced rate draw down values around 1480 fpm and above.

Study 3—Extrusion Coating and WVTR

The extrusion coating properties and "water vapor transmission rate" properties were examined for Samples 14C, 15C, 16, 17C, 18C and 19. See Table 11 above. Results are shown in Tables 25 and 26.

TABLE 25

Additional Extrusion Coating Results (Study 3)

|  | Neck-in at 440 fpm (inch) | Neck-in at 880 fpm (inch) | Draw Down (fpm) | Reduced Rate Draw Down (fpm) | HP (horse power) | Current (amp) | MELT Temperature (deg. F.) | Pressure (psi) |
| --- | --- | --- | --- | --- | --- | --- | --- | --- |
| Sample 14 | 2.000 | 1.875 | NB | 1250 | 22 | 119 | 601 | 1061 |
| Sample 15 | 2.125 | 1.875 | 1174 | Not tested | 23 | 122 | 599 | 1097 |
| Sample 16 | 2.000 | 1.875 | 1200 | Not tested | 25 | 125 | 602 | 1316 |
| Sample 17 | 2.125 | 2.000 | 920 | Not tested | 29 | 127 | 603 | 1554 |
| Sample 18 | 2.875 | 2.750 | 1423 | Not tested | 32 | 134 | 608 | 2118 |
| Sample 19 | 2.125 | — | 880 | Not tested | 30 | 131 | 609 | 1888 |

TABLE 26

WVTR of each Composition (Study 3)

|  | Sample | | | | | |
| --- | --- | --- | --- | --- | --- | --- |
|  | Sample 14 | Sample 15 | Sample 16 | Sample 17 | Sample 18 | Sample 19 |
| WVTR (g/100 in²/day) | 1.92 ± 0.10 | 1.71 ± 0.01 | 1.54 ± 0.22 | 1.13 ± 0.23 | 1.05 ± 0.01 | 1.85 ± 0.19 |

Samples 15-19 each contain the same LDPE (AGILITY EC 7000), and varying amounts of HDPE. The comparative Sample 18 contains a majority amount of the HDPE. Sample 15 contains a higher level of LDPE, than what is preferred. As seem in Tables 25 and 26, Sample 16 shows the better balance of extrusion coating properties (low neck-in and high drawn down) and water vapor transmission rate (low WVTR). The comparative Samples 15, 17 and 18 have either high WVTR value (Sample 15), or poor extrusion coating properties (e.g., high neck-in and low draw down for Sample 17, and high neck-in for Sample 18). It has been discovered that the inventive compositions containing at least 65 wt % of the LDPE have a better balance of extrusion coating properties and WVTR, as compared to the comparative samples containing more HDPE (Sample 18) and to comparative Sample 15, containing too much LDPE.

Compared to Sample 19, Sample 16 shows a better balance of the above properties—see Tables 25 and 26. It has been discovered, for this study, that when the melt index (I2) ratio of the "HDPE (the second composition)" to the "LDPE (first composition)" is from 0.50 to 2.70, a better balance of extrusion coating properties and lower WVTR results. It is postulated that this ratio range provides a faster crystallization rate, which leads to a higher crystallinity and lower WVTR. Sample 14 does not have HDPE, and has a higher WVTR (worse barrier) than the inventive Sample 16.

The invention claimed is:
1. A composition comprising at least the following:
  a) a first composition comprising at least one first ethylene-based polymer, formed by high pressure, free-radical polymerization, and wherein the first composition comprises the following properties: a melt index (I2) from 1.0 to 15.0 g/10 min, and density from 0.910 to 0.940 g/cc;
  b) a second composition comprising at least one second ethylene-based polymer, and wherein the second composition comprises the following properties; a melt index (I2) from 1.0 to 1000 g/10 min, and a density greater than 0.940 g/cc;
  wherein the melt index (I2) ratio of the melt index (I2) of the second composition to the melt index (I2) of the first composition is from 0.50 to 2.70;
  wherein the composition comprises the following properties: melt index (I2) from 2.0 to 20.0 g/10 min, and a density from 0.915 to 0.940 g/cc; and
  wherein the first composition is present in an amount from 65 to 95 wt %, based on the weight of the composition.
2. The composition of claim 1, wherein the melt index (I2) ratio of "the composition" to "the second composition" is from 0.30 to 2.00.
3. The composition of claim 1, wherein the first ethylene-based polymer is prepared in a tubular reactor.
4. The composition of claim 1, wherein the first composition comprises ≥95 wt % of the first ethylene-based polymer, based on the weight of the first composition.
5. The composition of claim 1, wherein the first ethylene-based polymer is a low density polyethylene (LDPE).
6. The composition of claim 1, wherein the second composition comprises ≥95 wt % of the second ethylene-based polymer, based on the weight of the second composition.
7. The composition of claim 1, wherein the second composition has a density from 0.940 to 0.966 g/cc.
8. The composition of claim 1, wherein the second ethylene-based polymer is a high density polyethylene (HDPE).
9. The composition of claim 1, wherein the melt index (I2) ratio of the composition to the first composition is from 0.50 to 3.00.
10. The composition of claim 1, wherein the first composition has a melt index (I2) from 3.0 to 10.0 g/10 min.
11. The composition of claim 1, wherein the first composition is present in an amount from 75 to 95 wt %, based on the weight of the composition.
12. The composition of claim 1, wherein the second composition has a melt index (I2) from 4.0 to 40.0 g/10 min.
13. The composition of claim 1, wherein the composition has a density from 0.910 to 0.930 g/cc.
14. The composition of claim 1, wherein the first composition, is prepared in a tubular reactor, and has a melt index (I2) from 3.0 to 10.0 g/10 min, and a G' value (at G"=500 Pa, 170° C.)≥127.5 Pa-1.25 Pa/(g/10 min)×I2.

15. The composition of claim 1, wherein the first composition is prepared in a tubular reactor, and has a melt index (I2) from 3.0 to 10.0 g/min, a density from 0.916 to 0.928 g/cc; the second composition has a melt index (I2) from 4.0 to 20.0 g/10 min, a density from 0.955 to 0.970 g/cc; and wherein the composition has a melt index (I2) from 3.0 to 10.0 g/10 min, and a G' (at G"=500 Pa, 170° C.) from 100 to 200 Pa; and wherein the second composition is present in an amount from 10 to 20 wt %, based on the weight of the composition.

16. The composition of claim 1, wherein a coating the composition has a Water Vapor Transmission Rate, WVTR (38° C. 100% RH according to ASTM1249-06, 1 mil coating)≤1.8 (g/100 in2/day.

17. An article comprising at least one component formed from the composition of claim 1.

18. The article of claim 17, wherein the article is a coating, a film, a foam, a laminate, a fiber, or a tape.

* * * * *

UNITED STATES PATENT AND TRADEMARK OFFICE
CERTIFICATE OF CORRECTION

PATENT NO. : 10,457,799 B2
APPLICATION NO. : 15/574261
DATED : October 29, 2019
INVENTOR(S) : Mehmet Demirors et al.

Page 1 of 1

It is certified that error appears in the above-identified patent and that said Letters Patent is hereby corrected as shown below:

In the Claims

Column 35, Line 13, Claim 16:
"16. The composition of claim 1, wherein a coating the"
Should read:
-- 16. The composition of claim 1, wherein a coating of the --.

Column 35, Line 16, Claim 16:
"coating)≤1.8 (g/100 in2/day."
Should read:
-- coating)≤1.8 (g/100 in2/day). --.

Signed and Sealed this
Twenty-fifth Day of August, 2020

Andrei Iancu
*Director of the United States Patent and Trademark Office*